United States Patent
Kobayashi et al.

(10) Patent No.: US 12,458,650 B2
(45) Date of Patent: Nov. 4, 2025

(54) URINATION DISORDER-IMPROVING AGENT

(71) Applicant: ASKA Pharmaceutical Co., Ltd., Tokyo (JP)

(72) Inventors: Hideo Kobayashi, Kanagawa (JP); Atsushi Shinbo, Kanagawa (JP); Youichi Nakano, Kanagawa (JP); Yuta Ito, Kanagawa (JP); Junichi Watanabe, Kanagawa (JP)

(73) Assignee: ASKA PHARMACEUTICAL CO., LTD., Tokyo (JP)

( * ) Notice: Subject to any disclaimer, the term of this patent is extended or adjusted under 35 U.S.C. 154(b) by 839 days.

(21) Appl. No.: 17/764,659

(22) PCT Filed: Jan. 29, 2020

(86) PCT No.: PCT/JP2020/003105
§ 371 (c)(1),
(2) Date: Mar. 29, 2022

(87) PCT Pub. No.: WO2021/065027
PCT Pub. Date: Apr. 8, 2021

(65) Prior Publication Data
US 2022/0331340 A1  Oct. 20, 2022

(30) Foreign Application Priority Data
Oct. 2, 2019  (JP) .................. 2019-182369

(51) Int. Cl.
*A61K 31/573* (2006.01)
*A61K 31/585* (2006.01)
*A61P 13/02* (2006.01)
*A61P 13/10* (2006.01)

(52) U.S. Cl.
CPC .......... *A61K 31/573* (2013.01); *A61K 31/585* (2013.01); *A61P 13/02* (2018.01); *A61P 13/10* (2018.01)

(58) Field of Classification Search
CPC .................................................. A61K 31/573
See application file for complete search history.

(56) References Cited

U.S. PATENT DOCUMENTS

| | | | |
|---|---|---|---|
| 5,496,823 | A | 3/1996 | Morioka et al. |
| 2004/0067967 | A1 | 4/2004 | Barden et al. |
| 2010/0261770 | A1 | 10/2010 | Suzuki et al. |
| 2013/0172317 | A1 | 7/2013 | Kai et al. |
| 2019/0127417 | A1 | 5/2019 | Nakagawa et al. |

FOREIGN PATENT DOCUMENTS

| | | |
|---|---|---|
| JP | 61-204198 | 9/1986 |
| JP | 5-155773 | 6/1993 |
| JP | 8-3045 | 1/1996 |
| JP | 2591640 | 3/1997 |
| JP | 2004-506744 | 3/2004 |
| JP | 2011-20972 | 2/2011 |
| KR | 10-2014-0054581 | 5/2014 |
| WO | 2009/081837 | 7/2009 |
| WO | 2012/020749 | 2/2012 |
| WO | 2017/195804 | 11/2017 |

OTHER PUBLICATIONS

International Search Report (ISR) issued Apr. 7, 2020 in International (PCT) Application No. PCT/JP2020/003105.
Japanese Office Action issued Sep. 2, 2020 in corresponding Japanese Patent Application No. 2020-535666, with English translation.
Mamoru Mieda et al., "Antiandrogenic Activity and Endocrinological Profile of a Novel Antiandrogen, TZP-4238, in the Rat", Endocrine Journal, 41 (4), pp. 445-452, 1994.
P. F. W. M. Rosier et al., "Is there a correlation between prostate size and bladder-outlet obstruction?", World Journal of Urology, 13: pp. 9-13, 1995, cited in the specification.
Michael J. Barry et al., "Relationship of Symptoms of Prostatism to Commonly Used Physiological and Anatomical Measures of the Severity of Benign Prostatic Hyperplasia", The Journal of Urology, vol. 150, pp. 351-358, Aug. 1993.
Young-Chol Park et al., "Clinical Study of TZP-4238 on Patients with Benign Prostatic Hypertrophy—with Special Reference to Urodynamics—", Acta Urologica Japonica, vol. 40, pp. 761-769, 1994, abstract, cited in CA & CB.
Extended European Search Report issued Sep. 27, 2023 in corresponding European Patent Application No. 20870759.6.

(Continued)

*Primary Examiner* — Nizal S Chandrakumar
(74) *Attorney, Agent, or Firm* — Wenderoth, Lind & Ponack, L.L.P.

(57) ABSTRACT

Provided is a urination disorder-improving agent useful for treating or improving (or alleviating) a urination disorder regardless of the degree or presence of prostatomegaly. The urination disorder-improving agent contains a 2-oxapregnane compound represented by the following formula (1) as an active ingredient. (In the formula, $R_1$ to $R_3$ represent an alkyl group such as methyl group, $R_4$ represents an alkylcarbonyl group such as acetyl group, X represents a halogen atom such as a chlorine atom, Y represents a hydroxyl group or oxo group bonded to the 11-position, 15-position, or 16-position of the steroid skeleton.)

7 Claims, 13 Drawing Sheets

(56) References Cited

OTHER PUBLICATIONS

Database Embase [Online] Elsevier Science Publishers, Amsterdam, NL; 1994, Noda S. et al., "Clinical study of TZP-4238 (osaterone acetate) for the treatment of benign prostatic hypertrophy. Evaluation of effects on residual urine" Nishinihon J. Urology, Abstract.
Y Wang et al., "Inhibition of prostate smooth muscle contraction and prostate stromal cell growth by the inhibitors of Rac, NSC23766 and EHT1864", British Journal of Pharmacology, Wiley-Blackwell, UK, vol. 172, No. 11, May 5, 2015, pp. 2905-2917.
Database Embase [Online] Elsevier Science Publishers, Amsterdam, NL; 1994, Honma S. et al., "The metabolic fate of osaterone acetate (TZP-4238). (5) Identification and characterization of TZP-4238 metabolites in blood, bile, urine and feces and humans and animals", Pharmacometrics, Abstract.
International Preliminary Report on Patentability issued Apr. 5, 2022 in International (PCT) Application No. PCT/JP2020/003105.
Kouichi Minato et al., "Metabolism of osaterone acetate in dogs and humans", Steroids, vol. 70, pp. 563-572 (2005).
Kouichi Minato et al., "Pharmacokinetics and Biliary Excretion of Osaterone Acetate, A New Steroidal Antiandrogen, in Dogs", Drug Metabolism & Disposition, vol. 30, No. 2, pp. 167-173 (2002).
Office Action issued Dec. 12, 2023 in corresponding Indian Patent Application No. 202217022702, pp. 1-6.
Official Hearing Notice issued Jun. 18, 2024 in corresponding Indian Patent Application No. 202217022702, with English-language translation.
Takegawa et al., "Antiandrogen. II. Oxygenated 2-Oxapregnane Steroids", Chem. Pharm. Bull., vol. 41, No. 5, pp. 870-875 (May 1993).
Office Action issued Jun. 2, 2025 in corresponding European Patent Application No. 20870759.6.

[Fig. 1]
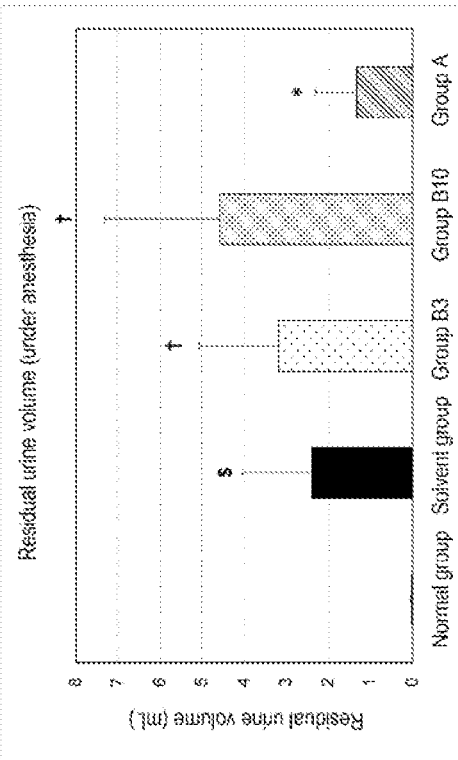
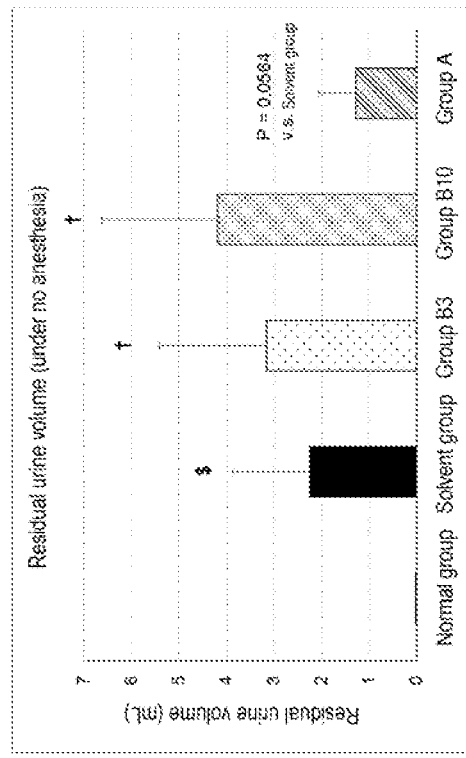

[Fig. 2]
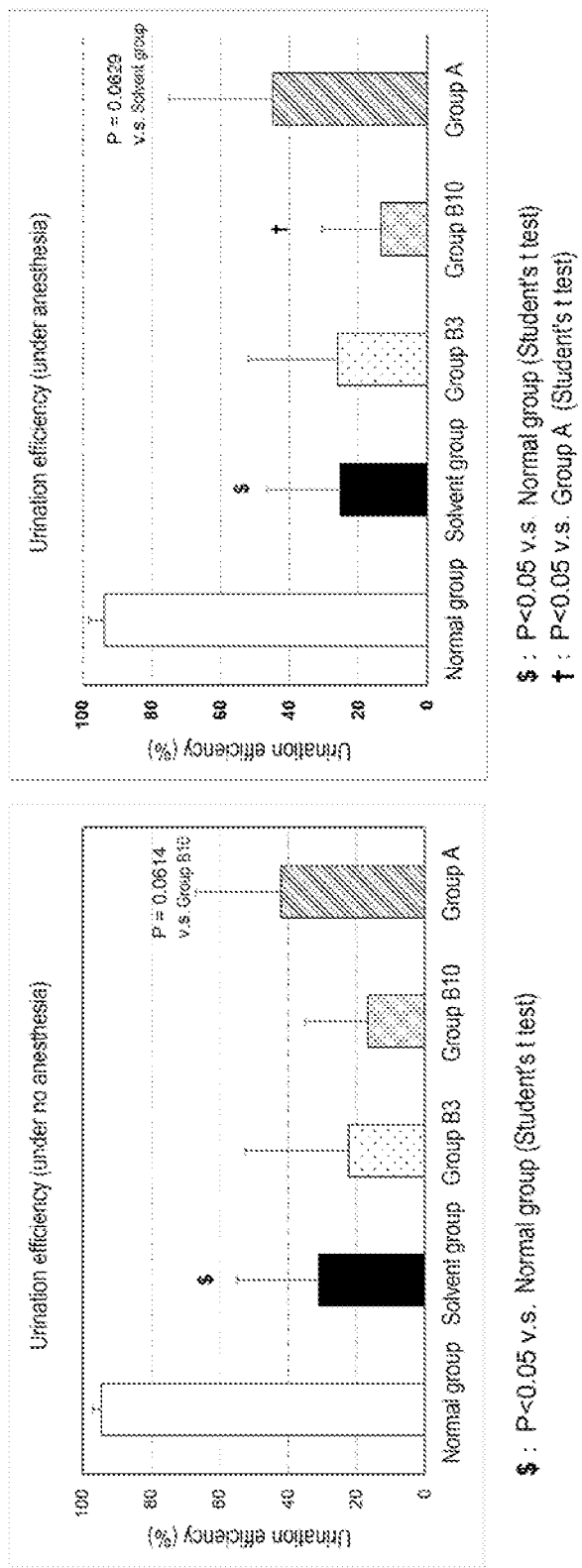

[Fig. 3]
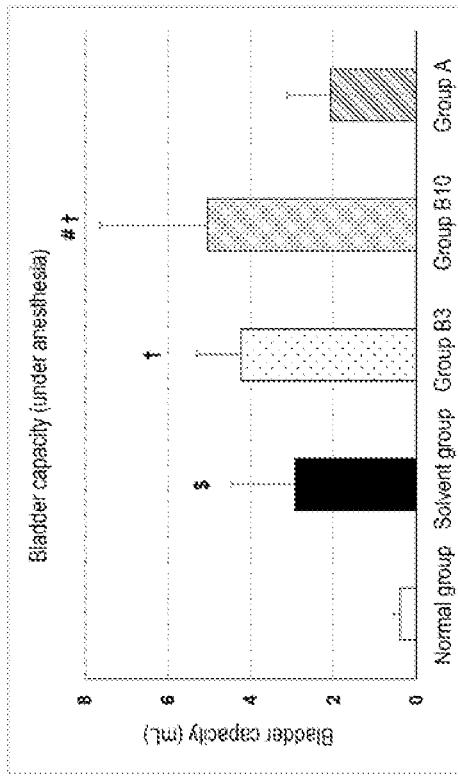
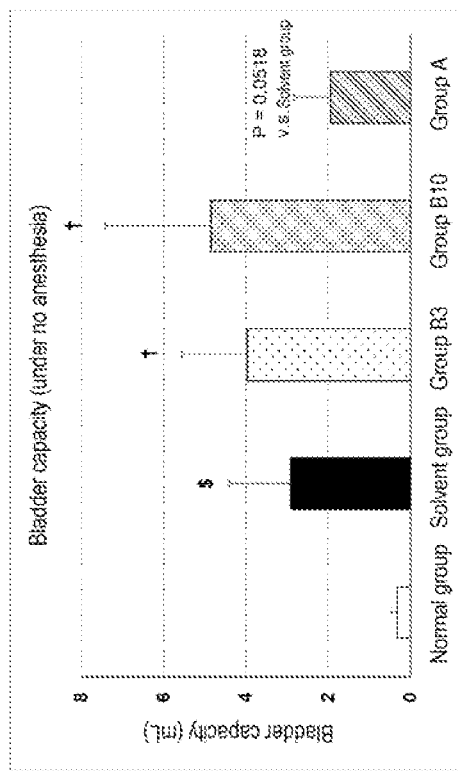

[Fig. 4]
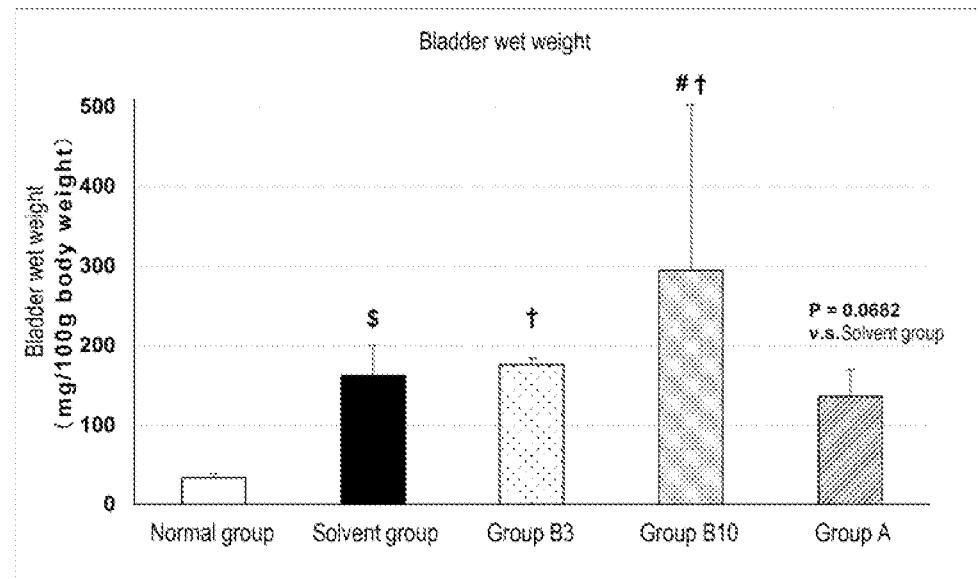
[Fig. 5]
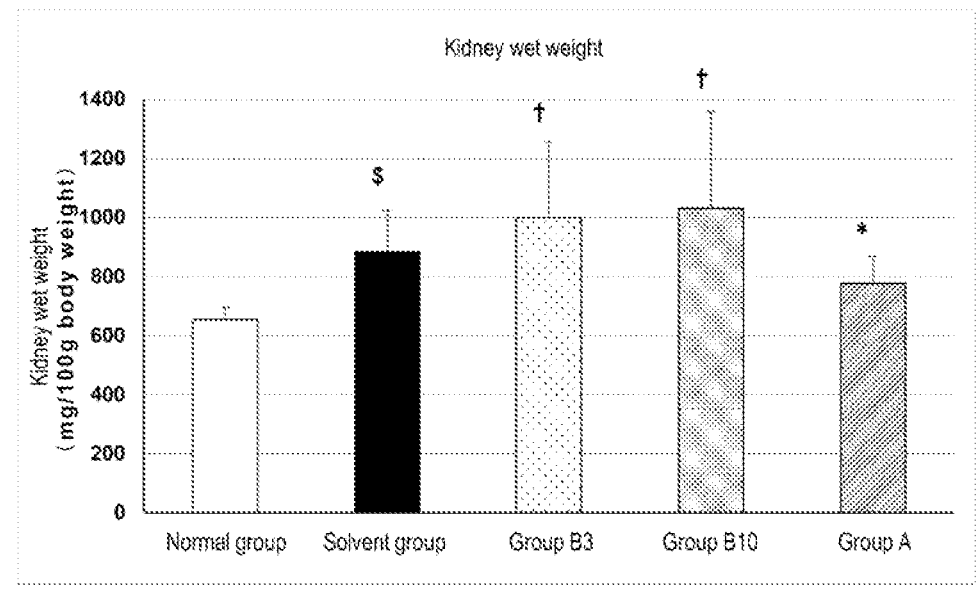

[Fig. 6]
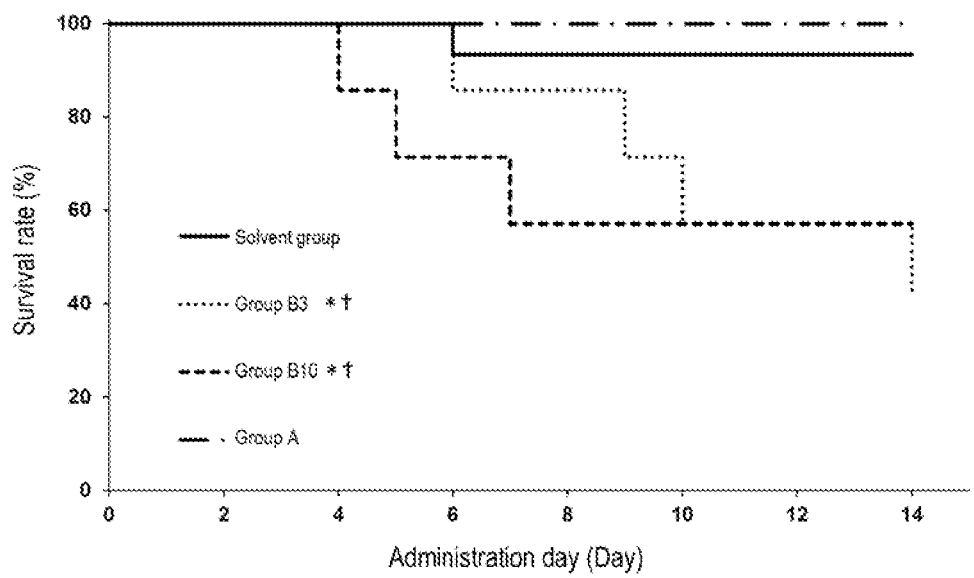
[Fig. 7]
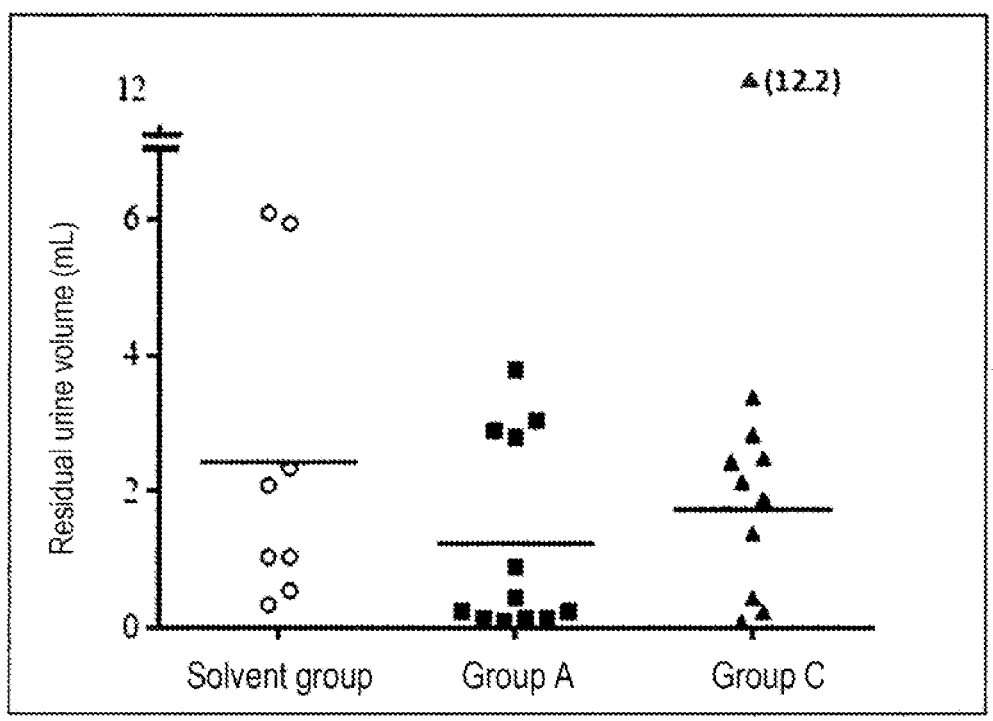

[Fig. 8]
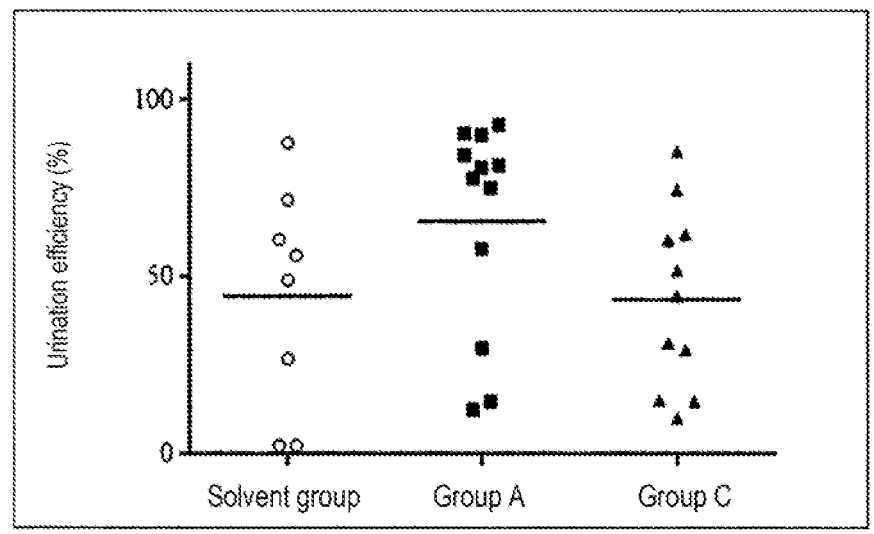
[Fig. 9]
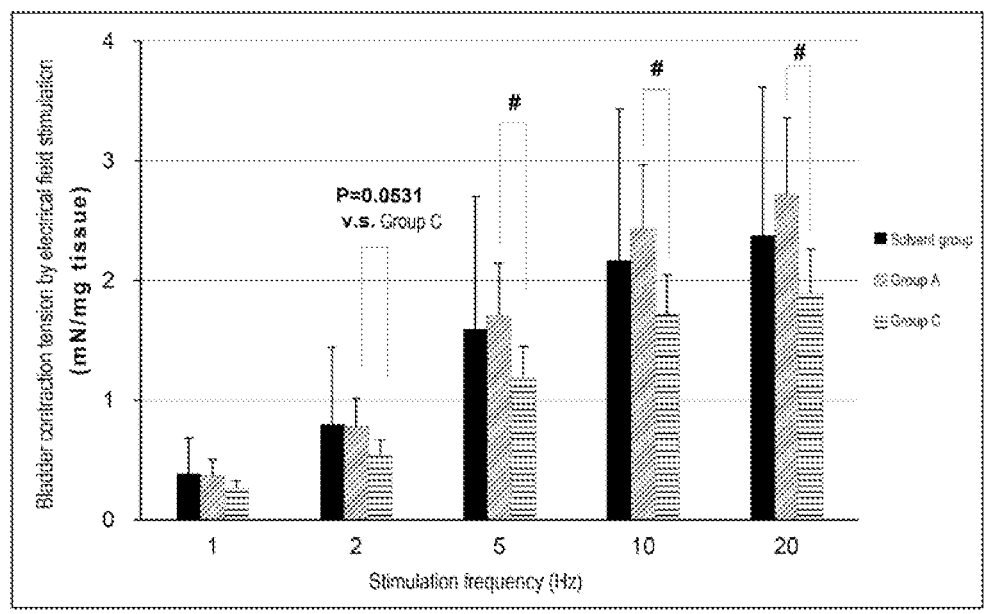
\# : P<0.05 v.s. Group C (Student's t test)

[Fig. 10]
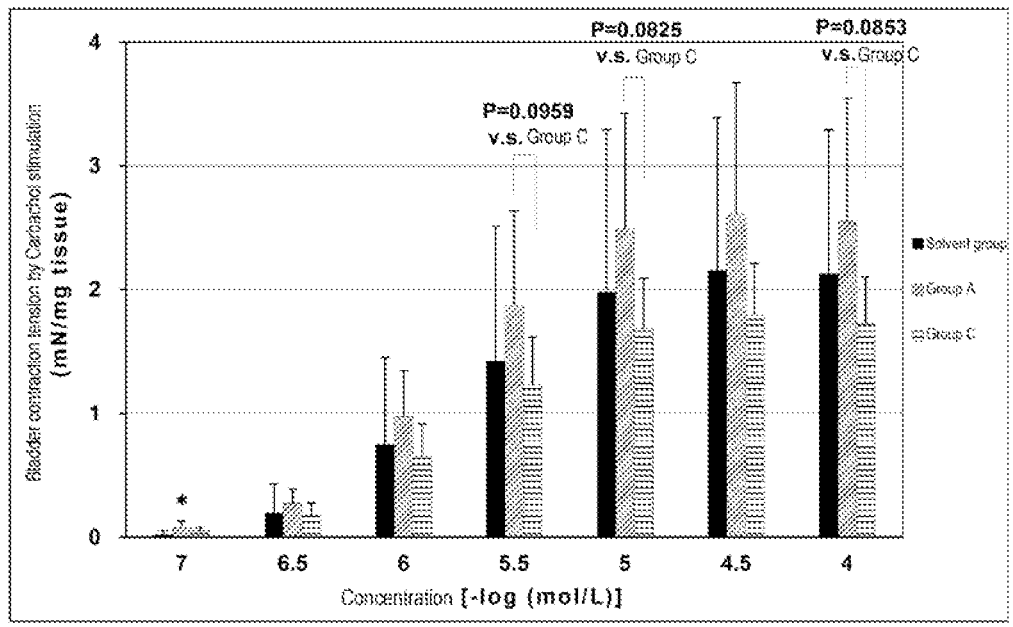
[Fig. 11]
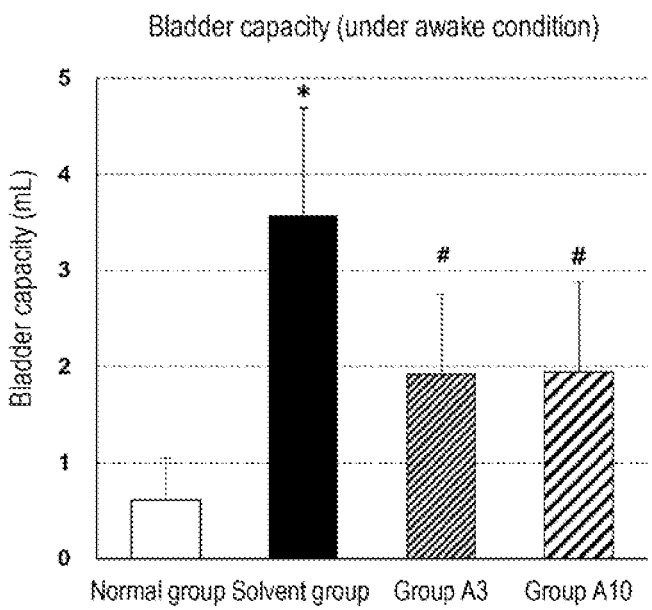

[Fig. 12]
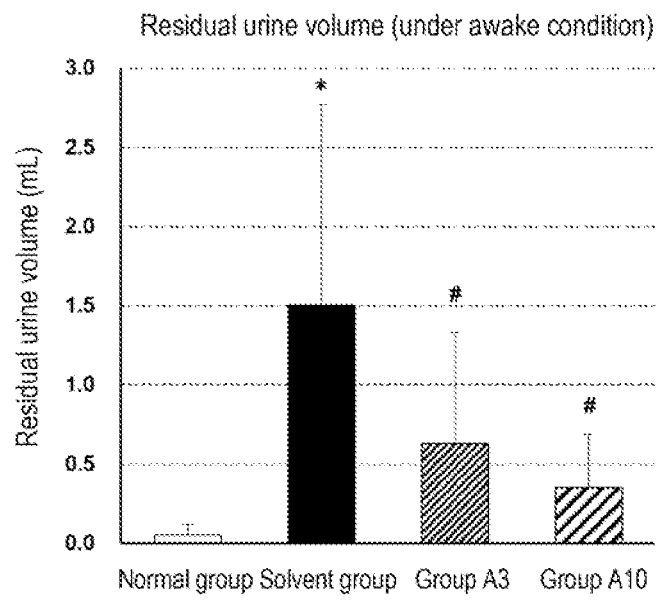
[Fig. 13]
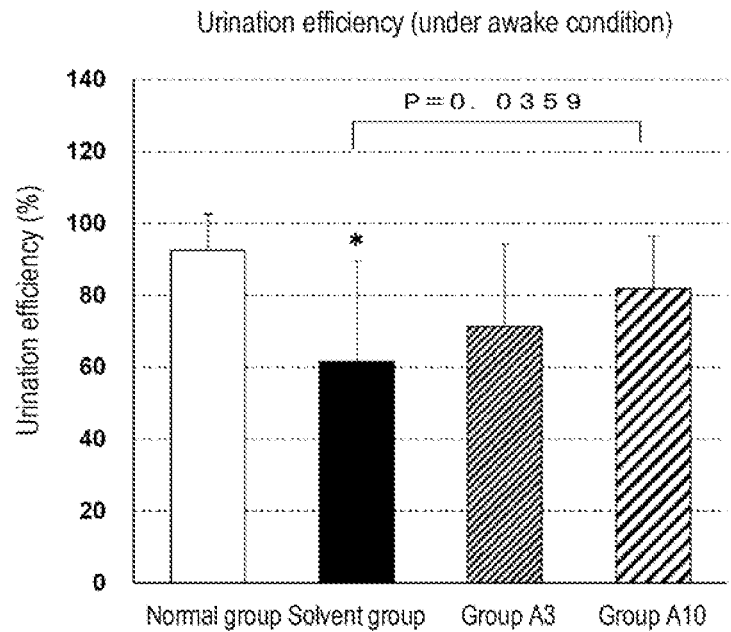

[Fig. 14]
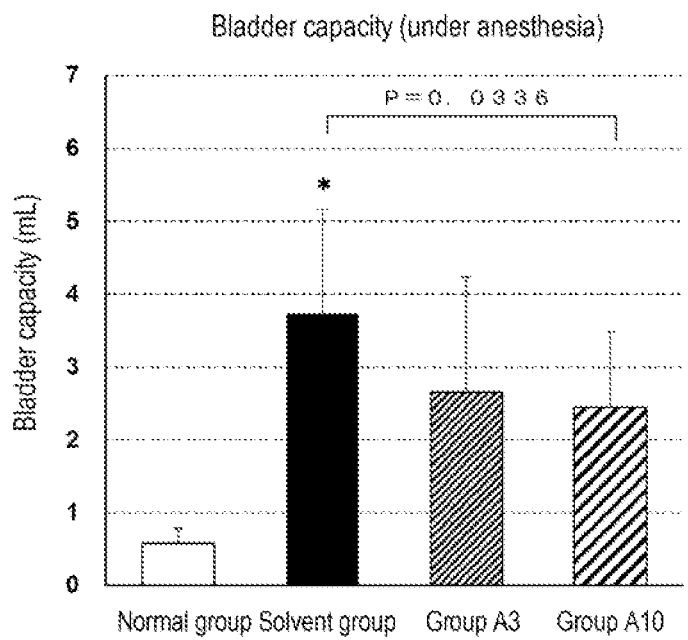
[Fig. 15]
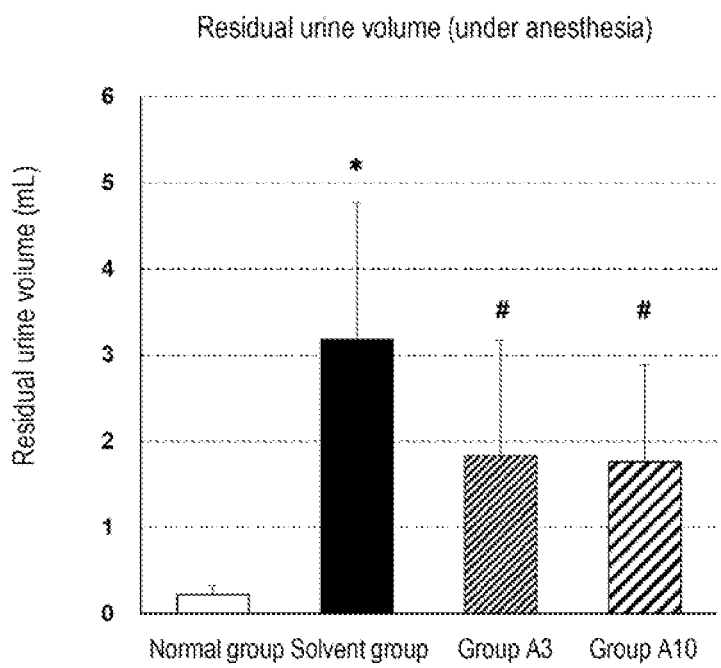

[Fig. 16]
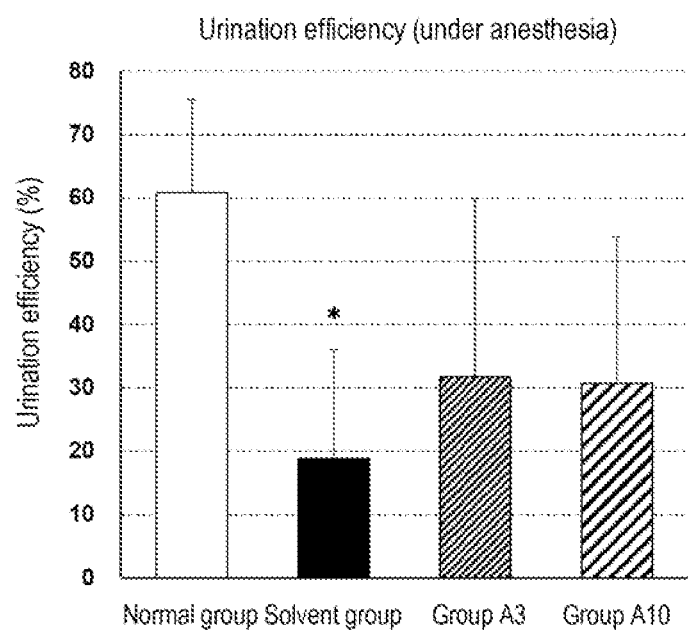

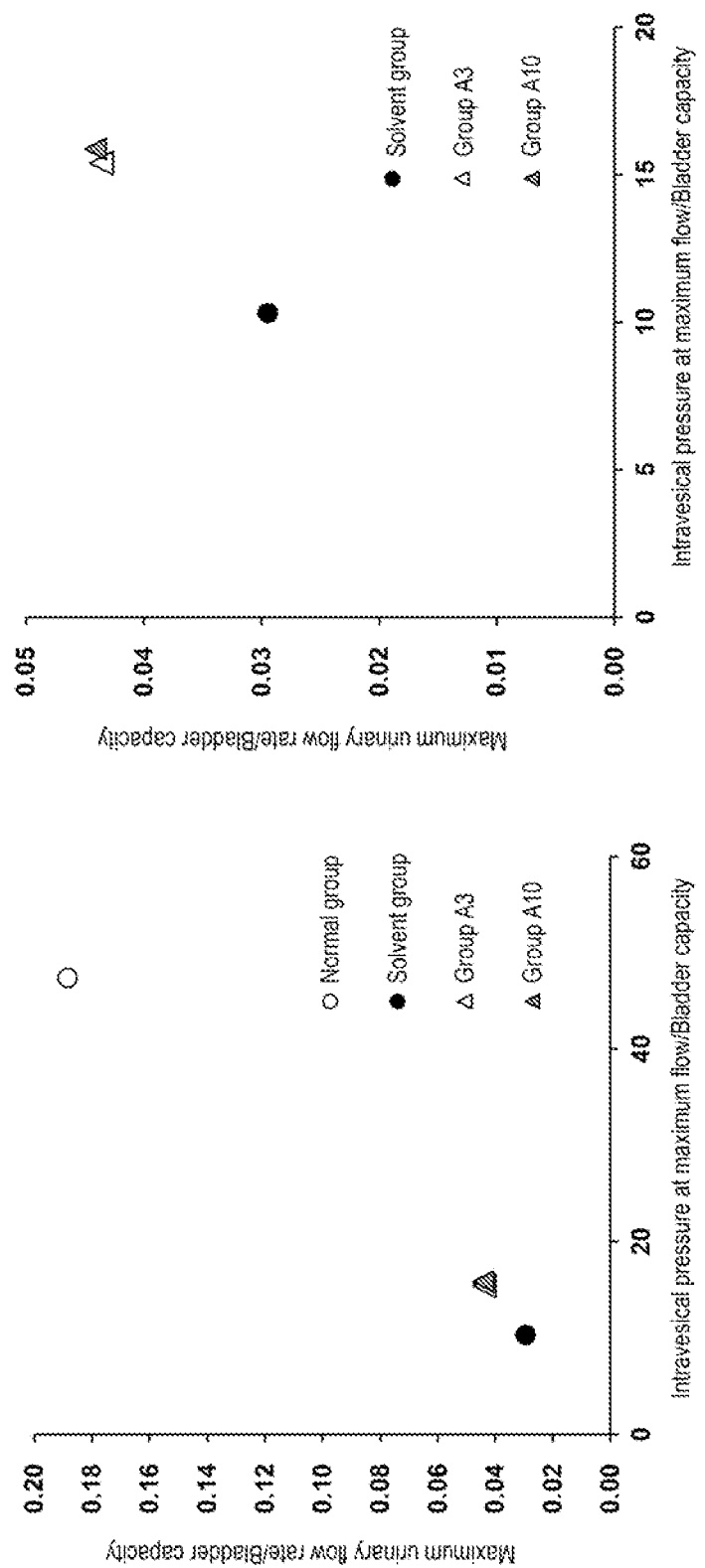
[Fig. 17]

[Fig. 18]
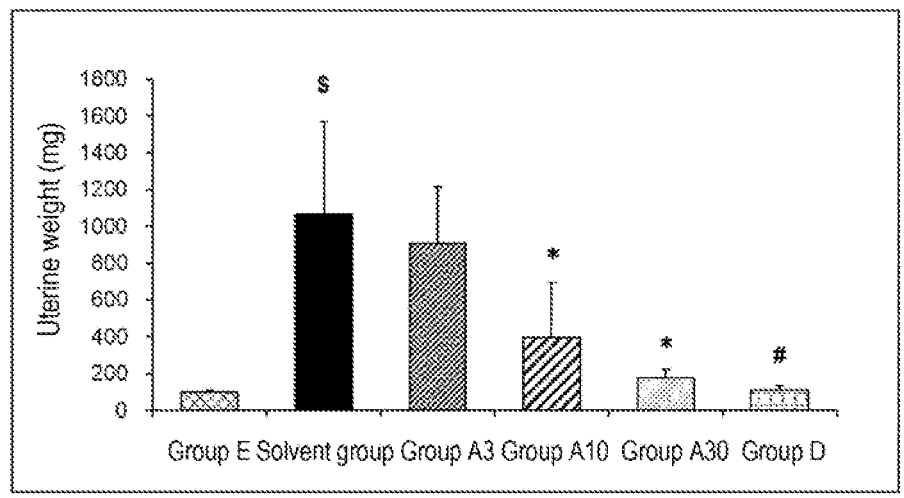
$ : P < 0.05 vs Group E (Student's t test)
* : P < 0.025 vs Solvent group (Williams's multiple comparison test)
# : P < 0.05 vs Solvent group (Student's t test)
[Fig. 19]
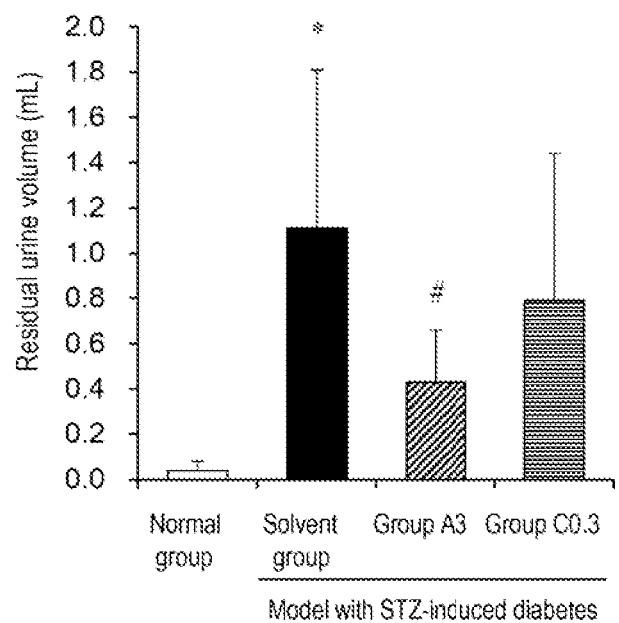

[Fig. 20]
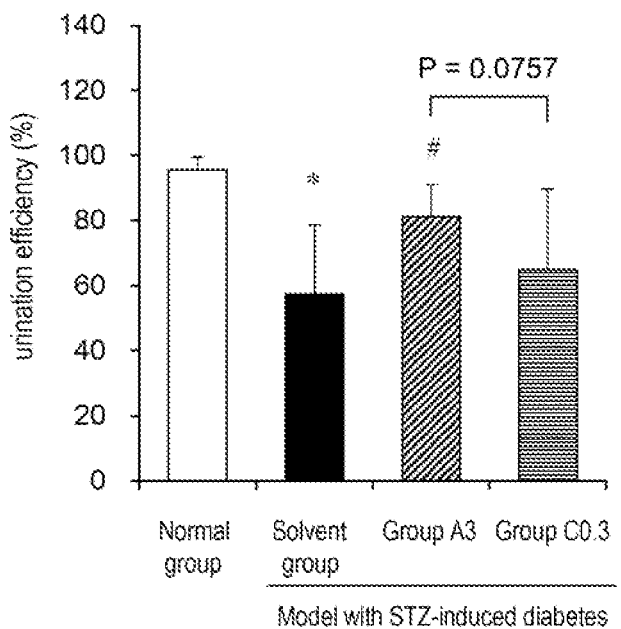
[Fig. 21]
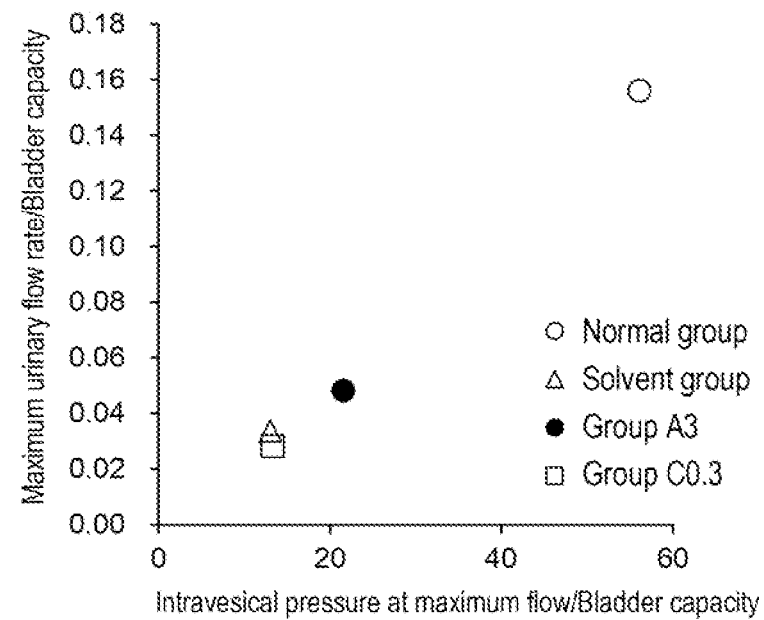

URINATION DISORDER-IMPROVING AGENT

TECHNICAL FIELD

The present invention relates to a urination disorder-improving agent (or an agent for improving a urination disorder) containing a pregnane compound or a pharmaceutically acceptable salt thereof as an active ingredient and being useful for improving the urination disorder such as feeling of incomplete emptying.

BACKGROUND ART

As the aging society progresses, it has been desired to improve or alleviate (or mitigate) urination disorders in older persons, where the urination disorders include, for example, diseases or symptoms such as difficulty in urination, feeling of incomplete emptying, frequent urination, and urinary incontinence. As agents for improving such a urination disorder, Japanese Patent Application Laid-Open Publication No. H5-155773 (JP H5-155773 A, Patent Document 1) discloses a zanthine derivative effective in treatment and prevention of a urination disorder such as frequent urination or urinary incontinence. Japanese Patent Application Laid-Open Publication No. H8-3045 (JP H8-3045 A, Patent Document 2) discloses a urination disorder-improving drug containing a N-substituted indole derivative as an active ingredient. WO 2012/020749 (Patent Document 3) discloses a triazine derivative and a pharmaceutical composition containing the triazine derivative and having art analgesic effect or an improving effect of a urination disorder.

Commercially available urination disorder-improving drugs include, for example, an al blocker and a 5α-reductase inhibitor. The 5α-reductase inhibitor prevents production of dihydrotestosterone from testosterone and shrinks enlarged prostate, improving a urination disorder.

Japanese Patent Application Laid-Open Publication No. S61-204198 (JP S61-204198 A, Patent Document 4) and Endocrine Journal 1994, 41(4), 445-452 (Nonpatent Document 1) disclose TZP-4238 (17α-acetoxy-6-chloro-2-oxa-4,6-pregnadiene-3,20-dione) as an antiandrogenic agent and also disclose that TZP-4238 is useful for treating diseases such as prostatomegaly (or prostate enlargement) and prostatic cancer.

Japanese Patent No. 2591640 (JP 2591640 B, Patent Document 5) discloses a 2-oxapregnane compound as a compound having an antiandrogenic activity, including 17α-acetoxy-6-chloro-15β-hydroxy-2-oxa-4,6-pregnadiene-3,20-dione. This document discloses that the compound is useful as an agent for treating an androgen-dependent disease, for example, benign prostatic hyperplasia, prostatic cancer, and alopecia.

Regarding plant preparations, Japanese Patent Application Laid-Open Publication No. 2011-20972 (JP 2011-20972 A, Patent Document 6) discloses a urination disorder-improving agent containing a saw palmetto extract and containing oleic acid and myristic acid in a ratio of 1:0 to 2:3. The Patent Document 6 discloses that, as males are aged, the prostate enlarges to grow and enlarge the portion (periurethral gland) close to the urethra (mechanical obstruction), and dihydrotestosterone accumulates in the prostate, resulting in a development of benign prostate hyperplasia (BPH). This document discloses that symptoms of benign prostate hyperplasia include lower urinary tract symptoms such as difficulty in urination and frequent urination.

However, the prostate enlargement does not always cause a urination disorder. For example, World Journal of Urology, 13,9-13 (1995) (Nonpatent Document 2) reports that there is a statistically significant relationship between prostate size and bladder-outlet obstruction while there is no correlation between a symptom of a urination disorder and a degree of bladder-outlet obstruction or a prostate size.

The Journal of Urology, 150, 351-358 August 1993 (Nonpatent Document 3) reports that there is no correlation between prostate size and residual urine volume and that there is no correlation among residual urine volume, prostate size, and various symptoms. Specifically, this document provides a correlation matrix for patients with benign prostatic hyperplasia (BPH) and discloses that, despite a relatively large sample size, there were no statistically significant relationships among symptom severity, residual urine volume, and prostate size or prostate specific antigen (PSA) level. This document discloses that prostate enlargement, which is also an attribute of BPH, is not a critical factor in the production of either symptoms or physiological outlet obstruction. In addition, this document discloses that in some patients (individuals), a physiological disorder can be induced even if the degree of hyperplasia in the periurethral area is small, while in other patients (individuals), considerable hyperplasia can occur without developing the disorder.

Thus, it is intended to effectively treat or improve a urination disorder regardless of the degree or presence of prostate enlargement. Further, the treatment of the urination disorder includes administration to patients such as older persons for a long period of time and is to have a high therapeutic effect and a high safety.

CITATION LIST

Patent Literature

Patent Document 1: JP H5-155773 A (Claims)
Patent Document 2: JP H8-3045 A (Claims)
Patent Document 3: WO 2012/020749 (Claims)
Patent Document 4: JP S61-204198 A (Claims, and page 1, the right column)
Patent Document 5: JP 2591640 B (Claims, and column 11, line 49 to column 12, line 49)
Patent Document 6: JP 2011-20972 A (Claims and [0002])

Nonpatent Literature

Nonpatent Document 1: Endocrine Journal 1994, 41(4), 445-452
Nonpatent Document 2: World Journal of Urology, 13,9-13 (1995) (Summary)
Nonpatent Document 3: The Journal of Urology, 150, 351-358 August 1993 (page 354, the right column, lines 5 to 10, page 355, the left column, line 9 from the bottom to page 355, the right column, line 6, Table 3, and Table 5)

SUMMARY OF INVENTION

Technical Problem

It is therefore an object of the present invention to provide a urination disorder-improving agent useful for treating or improving (or alleviating or mitigating) the urination disorder.

Another object of the present invention is to provide a urination disorder-improving agent having a high safety and being useful for treating or improving the urination disorder with a high therapeutic or improving effect even if the agent is administered for a long period of time.

It is still another object of the present invention to provide a urination disorder-improving agent useful for treating or alleviating (or mitigating) the urination disorder regardless of the degree or presence of prostatomegaly (or prostate enlargement).

Solution to Problem

The inventors of the present invention made intensive studies on a relationship between a urination disorder and 2-oxapregnane compounds having an oxo group on the 2-position of a steroid skeleton thereof and having a high antiandrogenic activity to achieve the above objects and found that even if the 2-oxapregnane compounds have a high antiandrogenic activity, great variations in improvement of the urination disorder are found depending on the presence or absence of a hydroxyl group or oxo group on a predetermined site of a steroid skeleton thereof. Specifically, the inventors found that a compound without a hydroxyl group on the predetermined site of the steroid skeleton shows no therapeutic effects on the urination disorder in a subject having no prostatomegaly in spite of a high antiandrogenic activity thereof, while a compound with a hydroxyl group or oxo group on the predetermined site of the steroid skeleton shows a high therapeutic or improving effect on the urination disorder regardless of the presence of prostatomegaly. The present invention was accomplished based on the above findings.

That is, the present invention provides a urination disorder-improving agent (a urination disorder-alleviating agent, or an agent for improving or alleviating a urination disorder) containing a 2-oxapregnane compound represented by the following formula (1) or a pharmaceutically acceptable salt thereof as an active ingredient. Incidentally, in the following formula (1), respective positions of the steroid skeleton are denoted by positional numbers.

[Chem. 1]

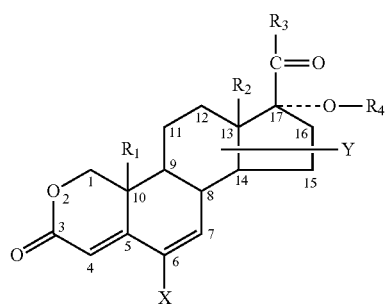

(1)

In the formula, $R_1$ to $R_3$ are the same or different and each represent an alkyl group, $R_4$ represents a hydrogen atom or an alkylcarbonyl group, X represents a halogen atom, Y represents a hydroxyl group or oxo group bonded to the 11-position, 15-position, or 16-position of the steroid skeleton.

$R_1$ to $R_3$ are the same or different and may each represent a $C_{1-4}$alkyl group (for example, methyl group). $R_4$ may be a lower alkanoyl group or acyl group (a $C_{1-4}$alkyl-carbonyl group), for example, acetyl group. The halogen atom represented by X may be a chlorine atom. Y may be a hydroxyl group or oxo group bonded to the 15-position of the steroid skeleton. A representative 2-oxapregnane compound represented by the formula (1) may be 17α-acetoxy-6-chloro-15β-hydroxy-2-oxa-4,6-pregnadiene-3,20-dione.

The compound or the pharmaceutically acceptable salt thereof is useful for preventing, treating, or improving or alleviating (or mitigating) a urination disorder or symptom. For example, the urination disorder may be at least one disease or symptom selected from feeling of incomplete emptying, slow stream, hesitancy (or urination delay), straining (or abdominal pressure urination), terminal dribble, post micturition dribble, urinary incontinence (including urge, stress, mixed, and overflow), frequent urination (including increased daytime frequency, nocturia, and psychogenic frequent urination), urgency, bladder pain or bladder pain syndrome, pain on urination, cystatrophia, neurogenic bladder, detrusor overactivity or overactive bladder (including idiopathic, neurogenic, and refractory), chronic cystitis, interstitial cystitis, chronic prostatitis, pelvic pain syndrome, underactive bladder, and detrusor hyperactivity with impaired contractile function (or detrusor hyperactivity with impaired contraction). Specifically, the compound or the pharmaceutically acceptable salt thereof shows a high therapeutic or improving effect on the urination disorder regardless of the presence of benign prostatic hyperplasia. That is, the urination disorder may be either a urination disorder having no benign prostatic hyperplasia or a urination disorder associated with benign prostatic hyperplasia. Thus, a subject with the urination disorder may be either a male or a female (a man or a woman). The urination disorder may be a urination disorder associated with a smooth muscle contraction disorder. The urination disorder may be a urination disorder associated with at least one disease selected from the following: a disease causing or inducing neurogenic bladder; diabetes; and neuropathy associated with diabetes. The urination disorder-improving agent may improve or promote urination. Thus, the urination disorder-improving agent may also be referred to as a urination improver or a urination promotor.

The present invention includes a method for treating, or improving or alleviating (or mitigating) a urination disorder (and a method for improving or promoting urination), the method including administering, to a subject with a urination disorder, a 2-oxapregnane compound represented by the formula (1) or a pharmaceutically acceptable salt thereof as an active ingredient. Further, the present invention includes use of a 2-oxapregnane compound represented by the formula (1) or a pharmaceutically acceptable salt thereof as an active ingredient for treating, or improving or alleviating (or mitigating) a urination disorder (and improving or promoting urination); and use of a 2-oxapregnane compound represented by the formula (1) or a pharmaceutically acceptable salt thereof for producing the urination disorder-improving agent, urination improver, or urination promotor. The dosage for a human being as a subject (or patient) may be about 0.01 to 100 mg per day in terms of the compound represented by the formula (1).

Advantageous Effects of Invention

According to the present invention, the urination disorder-improving agent contains the specific 2-oxapregnane compound or the pharmaceutically acceptable salt thereof and thus enables the effective treatment or improvement (or alleviation or mitigation) of the urination disorder. Moreover, the compound or the pharmaceutically acceptable salt thereof has a high safety, allowing the urination disorder to be improved with a high therapeutic or improving effect even when administered for a long period of time. Further, the compound or the pharmaceutically acceptable salt thereof has a hydroxyl group or oxo group on the predetermined site of the steroid skeleton and thus enables the treatment or alleviation (or mitigation) of the urination disorder regardless of the degree or presence of prostatomegaly.

BRIEF DESCRIPTION OF DRAWINGS

FIG. 1 is a graph showing a relationship between the residual urine volume and the test substances under no anesthesia and under anesthesia in Test Example 1.

FIG. 2 is a graph showing a relationship between the urination efficiency and the test substances under no anesthesia and under anesthesia in Test Example 1.

FIG. 3 is a graph showing a relationship between the bladder capacity and the test substances in Test Example 1.

FIG. 4 is a graph showing a relationship between the bladder wet weight and the test substances in Test Example 1.

FIG. 5 is a graph showing a relationship between the kidney wet weight and the test substances in Test Example 1.

FIG. 6 is a graph showing a relationship between the survival rate and the test substances in Test Example 1.

FIG. 7 is a graph showing a relationship between the residual urine volume and the test substances in Test Example 2.

FIG. 8 is a graph showing a relationship between the urination efficiency and the test substances in Test Example 2.

FIG. 9 is a graph showing a relationship between the bladder contraction tension by square-wave electrical field stimulation and the test substances in Test Example 3.

FIG. 10 is a graph showing a relationship between the test substances and the bladder contraction tension by Carbachol (muscarinic receptor stimulation) and KCl (depolarization-dependent $Ca^{2+}$ stimulation) in Test Example 3.

FIG. 11 is a graph showing a relationship between the bladder capacity and the test substances in cystometry (CMG) under awake condition of Test Example 4.

FIG. 12 is a graph showing a relationship between the residual urine volume and the test substances in cystometry (CMG) under awake condition of Test Example 4.

FIG. 13 is a graph showing a relationship between the urination efficiency and the test substances in cystometry (CMG) under awake condition of Test Example 4.

FIG. 14 is a graph showing a relationship between the bladder capacity and the test substances in cystometry (CMG) under anesthesia of Test Example 4.

FIG. 15 is a graph showing a relationship between the residual urine volume and the test substances in cystometry (CMG) under anesthesia of Test Example 4.

FIG. 16 is a graph showing a relationship between the urination efficiency and the test substances in cystometry (CMG) under anesthesia of Test Example 4.

FIG. 17 is a graph showing the results of nomogram analysis in Test Example 4.

FIG. 18 is a graph showing a relationship between the uterine weight and the test substances in Test Example 5.

FIG. 19 is a graph showing a relationship between the residual urine volume and the test substances in cystometry (CMG) under awake condition of Test Example 6.

FIG. 20 is a graph showing a relationship between the urination efficiency and the test substances in cystometry (CMG) under awake condition of Test Example 6.

FIG. 21 is a graph showing the results of nomogram analysis in Test Example 6.

DESCRIPTION OF EMBODIMENTS

[2-Oxapregnane Compound or Pharmaceutically Acceptable Salt Thereof]

A compound represented by the formula (1) is described in the Patent Document 5 and has been known. As mentioned above, such a compound has a high antiandrogenic activity and is useful as an agent for treating benign prostatic hyperplasia, while the compound has a characteristic that effectively treats or improves a urination disorder regardless of prostate enlargement.

In the formula (1), as examples of an alkyl group represented by each of $R_1$ to $R_3$, there may be mentioned a straight-chain or branched-chain $C_{1-6}$alkyl group such as methyl group, ethyl group, propyl group, isopropyl group, butyl group, isobutyl group, s-butyl group, or t-butyl group. The alkyl group is usually a straight-chain or branched-chain $C_{1-4}$alkyl group, preferably a straight-chain or branched-chain $C_{1-3}$alkyl group, and more preferably methyl group or ethyl group. The alkyl group may practically be methyl group. Specifically, $R_1$ to $R_3$ may be the same or a different alkyl group. Each of $R_1$ to $R_3$ may practically be methyl group.

$R_4$ may be either a hydrogen atom or an alkylcarbonyl group or may practically be an alkylcarbonyl group (an alkanoyl group or acyl group). The alkylcarbonyl group (or acyl group) represented by $R_4$ may include, for example, a straight-chain or branched-chain $C_{1-10}$alkyl-carbonyl group such as acetyl group, propionyl group, butyryl group, isobutyryl group, t-butyryl group, pentanoyl group (valeryl group), or hexanoyl group. The alkylcarbonyl group is usually a straight-chain or branched-chain $C_{1-6}$alkyl-carbonyl group, preferably a $C_{1-4}$alkyl-carbonyl group, and more preferably a $C_{1-3}$alkyl-carbonyl group. The alkylcarbonyl group may practically be acetyl group. The alkylcarbonyl group represented by $R_4$ may be converted into a hydrogen atom by hydrolysis with a hydrolase. The hydrogen atom represented by $R_4$ may be converted into an alkylcarbonyl group by an acylase.

A halogen atom represented by X may include a fluorine atom, a chlorine atom, a bromine atom, and an iodine atom. The halogen atom may practically be a fluorine atom, a chlorine atom, or a bromine atom, particularly a chlorine atom.

The position of a hydroxyl group or oxo group represented by Y may be either the 11-position, 15-position, or 16-position of the steroid skeleton. The hydroxyl group or oxo group may practically be bonded to the 15-position of the steroid skeleton.

Oxo groups and hydroxyl groups of the steroid skeleton may mutually be convertible by an in vivo oxidoreductase. Thus, Y may be either a hydroxyl group or an oxo group. Y may practically be a hydroxyl group. In a case where Y is a hydroxyl group, the conformation of the hydroxyl group may be the α-position or β-position represented by the following formulae. For example, the conformation of the hydroxyl group bonded to the 15-position of the steroid skeleton may be the βposition.

[Chem. 2]

The compound represented by the formula (1) may include 17α-$C_{1-4}$alkyl-carbonyloxy-6-halo-15β-hydroxy-2-oxa-4,6-pregnadiene-3,20-dione and 17α-$C_{1-4}$alkyl-carbonyloxy-6-halo-2-oxa-4,6-pregnadiene-3,15,20-trione.

A preferred compound may have the hydroxyl group represented by Y on the 11-position, 15-position, or 16-position of the steroid skeleton and can be represented by the following formula (1a).

[Chem. 3]

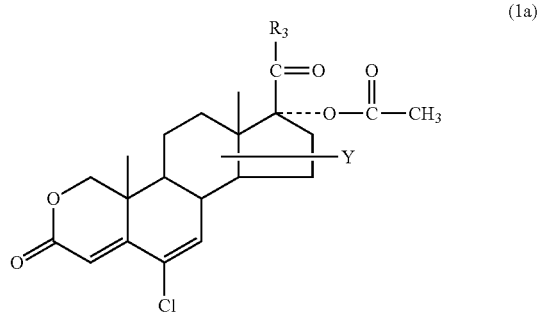

Representative examples of the compound represented by the formula (1a) or the pharmaceutically acceptable salt thereof may include 17α-acetoxy-6-chloro-15β-hydroxy-2-oxa-4,6-pregnadiene-3,20-dione or a pharmaceutically acceptable salt thereof.

The 2-oxapregnane compound represented by the formula (1) or the pharmaceutically acceptable salt thereof may be a racemate or may be an optically active substance (or an optical isomer). The 2-oxapregnane compound represented by the formula (1) or the pharmaceutically acceptable salt thereof may be a metabolite.

Examples of the salt may include a salt of an inorganic acid (such as hydrochloric acid or sulfuric acid), a salt of an organic acid (such as acetic acid), a salt of an inorganic base (e.g., ammonia, an alkali metal such as sodium or potassium, and an alkaline earth metal such as calcium), and a salt of an organic base (e.g., amines such as triethylamine).

The 2-oxapregnane compound represented by the formula (1) or the pharmaceutically acceptable salt thereof can be prepared according to a conventional method, for example, a method described in the Patent Document 5.

The 2-oxapregnane compound represented by the formula (1) or the pharmaceutically acceptable salt thereof may have an antiandrogenic activity or may act as an androgen receptor modulator. Further, the compound may have both an antiandrogenic action and an antiprogesterone action.

The urination disorder-improving agent according to the present invention contains at least the 2-oxapregnane compound represented by the formula (1) or the pharmaceutically acceptable salt thereof as an active ingredient and, if necessary, may further contain a physiologically active ingredient or a pharmacologically active ingredient (such as another urination improver). Examples of another urination improver (a second urination improver) may include an al receptor blocker (a depressor) or a prostatomegaly-treating drug (such as doxazosin mesilate, urapidil, prazosin hydrochloride, bunazosin hydrochloride, oxendolone, gestonorone caproate, chlormadinone acetate, tamsulosin hydrochloride, naftopidil, or silodosin), a 5α reductase inhibitor (such as dutasteride), an antiandrogen drug (such as methyltestosterone, testosterone propionate, testosterone enanthate, bicalutamide, or enzalutamide), a PDE5 inhibitor (such as tadalafil), and a crude drug. Such a second urination improver may be used in a ratio of about 0.1 to 100 parts by mass (e.g., about 1 to 50 parts by mass) relative to 100 parts by mass of the 2-oxapregnane compound represented by the formula (1).

The urination disorder-improving agent (or preparation) according to the present invention is effective in treating and/or preventing various urination disorders and improves or alleviates (or mitigates) the urination disorders. Thus, the urination disorder-improving agent may also be referred to as a therapeutic agent and/or preventive agent for treating and/or preventing a urination disorder or an alleviator or mitigator for alleviating or mitigating a urination disorder.

Examples of the urination disorder may include a disease or symptom such as difficulty in urination (disturbance on urination), feeling of incomplete emptying, slow stream, hesitancy, straining, terminal dribble, post micturition dribble, urinary incontinence (including urge, stress, mixed, and overflow), frequent urination (including increased daytime frequency, nocturia, and psychogenic frequent urination), urgency, bladder pain or bladder pain syndrome, pain on urination, cystatrophia, neurogenic bladder, detrusor overactivity or overactive bladder (including idiopathic, neurogenic, and refractory), chronic cystitis, interstitial cystitis, chronic prostatitis, pelvic pain syndrome, underactive bladder, or detrusor hyperactivity with impaired contractile function. Further, the symptom may be at least one symptom selected from increased residual urine volume, reduced urination efficiency, increased bladder capacity, and increased bladder wet weight and kidney wet weight. Such at least one symptom may be used as an index or criterion of the urination disorder. The urination disorder may be a disorder that causes these plural diseases or symptoms complexly. For example, difficulty in urination may be accompanied with feeling of incomplete emptying and slow stream. The urination disorder may practically occur as a symptom (for example, a lower urinary tract symptom) including feeling of incomplete emptying, slow stream, urinary incontinence, frequent urination, or urgency. Thus, according to the present invention, urination may be improved or promoted.

The above-mentioned urination disorder may be accompanied with prostatomegaly or may not be accompanied with prostatomegaly. That is, the urination disorder may be either a urination disorder having no benign prostatic hyperplasia or a urination disorder associated with benign prostatic hyperplasia. The present invention enables the urination disorder to be effectively treated or improved regardless of the degree and/or presence of prostatomegaly.

The urination disorder may be a urination disorder associated with a smooth muscle contraction disorder (a bladder smooth muscle contraction disorder). The types of the urination disorder may include, for example, urination disorders associated with the following diseases: a disease causing or inducing neurogenic bladder; diabetes; neuropathy associated with diabetes (afferent or efferent neuropathy of the micturition reflex system); hyperglycemia; and neuropathy associated with hyperglycemia. These urination disorders may be accompanied with benign prostatic hyperplasia or may be not accompanied with benign prostatic hyperplasia; and may practically be a urination disorder having no benign prostatic hyperplasia. The disease causing or inducing neurogenic bladder may be, for example, cerebrovascular disorder (stroke), Alzheimer's disease, Parkinson's disease, multiple sclerosis, cerebellar degeneration, myelomeningocele (spina *bifida*), tethered cord syndrome, herniated intervertebral disc, spinal stenosis, and peripheral neuropathy to the bladder caused by rectal cancer or uterine cancer surgery. Concretely, in neurogenic bladder as an example, even if no benign prostatic hyperplasia is accompanied, a urination disorder may be caused by inhibition of smooth muscle contraction due to central or peripheral neuropathy. Moreover, it is known that, in diabetes patients and/or hyperglycemia patients regardless of insulin dependence or insulin independence, the central or peripheral nerve is impaired or injured to cause a urination disorder due to complication neuropathy (such as sensory (afferent) or efferent neuropathy of the micturition reflex system). The diabetes may be type I and/or type II diabetes. Thus, the urination disorder may be caused by the inhibition of bladder smooth muscle contraction through the neuropathy. Moreover, clinically and nonclinically, it is also known that the urination disorder (for example, underactive bladder, a diabetic urination disorder) is associated with a bladder smooth muscle contraction disorder. The present invention enables such a urination disorder having no benign prostatic hyperplasia to be effectively treated or improved. Thus, a subject with the urination disorder may be either a male or a female (a man or a woman). The compound or the pharmaceutically acceptable salt thereof and the urination disorder-improving agent (or preparation) according to the present invention is useful for effectively treating or improving the urination disorder regardless of sex.

The urination disorder-improving agent according to the present invention may contain the 2-oxapregnane compound represented by the formula (1) or the pharmaceutically acceptable salt thereof alone or may be used as a pharmaceutical composition or physiologically active composition that contains the formula (1) or the pharmaceutically acceptable salt thereof and a carrier (such as a pharmacologically or physiologically acceptable carrier). The carrier of the urination disorder-improving agent (the pharmaceutical composition, the physiologically active composition) may be selected depending on the form (that is, the dosage form) of the preparation, the route of administration, the application (or use), and others. The dosage form is not particularly limited to a specific one and may be a solid preparation (for example, powdered preparations, powders, granulated preparations (such as granules or fine granules), spherical or spheroidal preparations, pills, tablets, capsules (such as soft capsules or hard capsules), dry syrups, suppositories, and film- or sheet-like preparations), a semisolid preparation (for example, creams, ointments, gels, and gumdrop-like preparations), or a liquid preparation (for example, injectable solutions (or injections) and syrups). In a preferred embodiment, the urination disorder-improving agent according to the present invention has a dosage form of a solid preparation, particularly, granulated preparations, tablets, or capsules.

The powdered preparations may also include sprays, aerosols, or others. The capsules may be either soft capsules or hard capsules; may be a capsule filled with a liquid; or may be a capsule filled with a solid preparation (such as granules). Moreover, the preparation may be a freeze-dried preparation. Further, the urination disorder-improving agent (or preparation) according to the present invention may be a preparation having a controlled release rate of the agent (an extended-release or sustained-release preparation or a rapid-release preparation). Moreover, the administration route of the urination disorder-improving agent (or preparation) is not limited to a specific route. The urination disorder-improving agent (or preparation) agent may be an orally administrable preparation (for example, granules, powders, tablets (e.g., sublingual tablets and orally disintegrating tablets), capsules, and film preparations) or a parenterally administrable preparation (for example, inhalations, preparations for transdermal administration, preparations for transnasal administration, suppositories, and injections). Furthermore, the preparation may be a topically or locally administrable preparation (such as ointments, patches, or cataplasms). The urination disorder-improving agent (or preparation) according to the present invention may practically be a solid preparation (for example, an orally administrable solid preparation). Accordingly, the components of the solid preparation will mainly be explained hereinafter.

The carrier may be selected, for example, depending on the administration route and the application of preparation, from components (e.g., diluents or excipients, binders, disintegrators, lubricants, and coating agents) listed in Japanese Pharmacopoeia 16$^{th}$ Edition, (1) Handbook of Pharmaceutical Excipients (Maruzen Company, ltd., (1989)), (2) Japanese Pharmaceutical Excipients Dictionary 2016 (Yakuji Nippo Ltd., issued February, 2016), (3) Pharmaceutics, revised fifth edition (Nankodo, Co., Ltd. (1997)), and (4) Japanese Pharmaceutical Excipients 2003 (Yakuji Nippo Ltd., issued August, 2003). For example, as the carrier for a solid preparation, at least one carrier selected from the group consisting of diluents, binders, and disintegrators is often used. Moreover, the urination disorder-improving agent (or preparation) may contain a lipid.

Examples of the diluents may include a saccharide or a sugar alcohol such as lactose, glucose, sucrose, mannitol, sorbitol, or xylitol; a starch such as a corn starch; a polysaccharide such as a crystalline cellulose (including a microcrystalline cellulose); and silicon dioxide or a silicate such as a light anhydrous silicic acid. As examples of the binders, there may be mentioned a soluble starch such as a pregelatinized starch or a partially pregelatinized starch; a polysaccharide such as gum acacia (or gum arabic), dextrin, or sodium alginate; a synthetic polymer such as a polyvinylpyrrolidone (PVP), a polyvinyl alcohol (PVA), a carboxyvinyl polymer, a polyacrylic polymer, a polylactic acid, or a polyethylene glycol; and a cellulose ether such as a methylcellulose (MC), an ethylcellulose (EC), a carboxymethylcellulose (CMC), a carboxymethylcellulose sodium, a hydroxyethylcellulose (HEC), a hydroxypropylcellulose (HPC), or a hydroxypropylmethylcellulose (HPMC). Examples of the disintegrators may include a sodium starch glycolate, a carmellose, a carmellose sodium, a carmellose calcium, a croscarmellose sodium, a crospovidone, and a low substituted hydroxypropylcellulose. These carriers may be used alone or in combination.

As the coating agents, there may be used, for example, a saccharide or a sugar, a cellulose derivative such as an ethylcellulose or a hydroxymethylcellulose, a polyoxyethylene glycol, a cellulose acetate phthalate, a hydroxypropylmethylcellulose phthalate, a methyl methacrylate-(meth) acrylic acid copolymer, and eudragit (a copolymer of methacrylic acid and acrylic acid). Such a coating agent may be an enteric component (e.g., a cellulose phthalate, a hydroxypropylmethylcellulose phthalate, and a methyl methacrylate-(meth)acrylic acid copolymer) or a gastric soluble component comprising a polymer (e.g., eudragit) containing a basic component such as a dialkylaminoalkyl (meth)acrylate. The preparation may be a capsule having such an enteric component or gastric soluble component as a capsule shell.

In the preparation, a known additive can suitably be used depending on an administration route, a dosage form, or others. Such an additive may include, for example, a lubricant, a disintegrant aid, an antioxidation agent or an antioxidant, a stabilizer, an antiseptic agent or a preservative, a fungicide or antibacterial agent, an antistatic agent, a corrigent or a masking agent, a coloring agent, a deodorant or a perfume, an algefacient, and an antifoaming agent. These additives may be used alone or in combination.

The urination disorder-improving agent (pharmaceutical composition or preparation) according to the present invention may be prepared using the active ingredient and, in addition, a carrier component and/or an optional additive or other components, with a conventional preparation manner (for example, a production process described in Japanese Pharmacopoeia 16th edition or a process in accordance with the production process).

The 2-oxapregnane compound or the pharmaceutically acceptable salt thereof, which is a known compound as described above, has been used over the years and has a high stability and a high safety.

The urination disorder-improving agent (pharmaceutical composition or preparation) according to the present invention can safely be administered to human beings and non-humans, usually mammals (for example, human beings, mice, rats, rabbits, dogs, cats, bovines, horses, pigs, and monkeys). The amount to be administered (dosage or dose) may be selected according to the species, age, body weight, and condition (e.g., a performance status, a condition of a disease, a presence of a complication) of the subject to be administered, the duration (or period or schedule) of administration, the dosage form, the administration method (or route), and others. For example, the dosage for human beings (daily dose) may be, in terms of the compound represented by the formula (1), about 0.01 to 100 mg/day, preferably about 0.05 to 75 mg/day (e.g., about 0.1 to 40 mg/day), and particularly about 0.05 to 10 mg/day (e.g., about 0.1 to 3 mg/day).

The administration method (or route) may be an oral administration or a local or parenteral administration (for example, hypodermic administration, intramuscular administration, transrectal administration, and transvaginal administration). In a preferred embodiment, the urination disorder-improving agent (pharmaceutical composition or preparation) according to the present invention is orally administered. The frequency of administration is not particularly limited to a specific one, and may, for example, be once a day or if necessary a plurality times a day (e.g., twice to three times a day).

As described above, the present invention also includes a method for treating, or improving or alleviating (or mitigating) the urination disorder (and a method for improving or promoting urination), the method including administering the 2-oxapregnane compound or the pharmaceutically acceptable salt thereof as an active ingredient to a subject with the urination disorder or administering the urination disorder-improving agent (pharmaceutical composition or preparation) to a subject with the urination disorder. Further, the present invention includes use of the 2-oxapregnane compound or the pharmaceutically acceptable salt thereof as an active ingredient for treating, or improving or alleviating (or mitigating) the urination disorder (and improving or promoting urination) or use of the urination disorder-improving agent (pharmaceutical composition or preparation) for treating, or improving or alleviating (or mitigating) the urination disorder (and improving or promoting urination). The present invention also includes use of the 2-oxapregnane compound or the pharmaceutically acceptable salt thereof for producing the urination disorder-improving agent, urination improver, or urination promotor.

EXAMPLES

The following examples are intended to describe this invention in further detail and should by no means be interpreted as defining the scope of the invention.

Test Example 1

A lower urinary tract obstruction model of rats was used as a test system. A test substance was orally administered to the lower urinary tract obstruction model repeatedly over two (2) weeks to examine the action on the urination function in the lower urinary tract obstruction model.

More specifically, the rats (female, Crl:CD(SD), 8-week-old; Charles River Laboratories Japan, Inc.) were operated to form lower urinary tract obstruction and repeatedly received oral administration of the test substance at a frequency of once a day over two (2) weeks. After the completion of the administration, each rat was subjected to bladder catheterization under anesthesia, cystometry under no anesthesia, then cystometry under urethane anesthesia, and euthanasia under deep anesthesia, and the tissues (bladder, kidney) of the rat were extracted or surgically removed. As a normal group, the rats without operation for forming lower urinary tract obstruction were used.

The test system, the test substances, and the dosage are as follows.

Normal group: 0.5 v/v. Polysorbate 80 solution, 10 mL/kg (n=6)
Solvent group (control group): 0.5 v/v % Polysorbate 80 solution, 10 mL/kg (n=15)
Group A: Compound A, 10 mg/kg (n=15)
Group B3: Compound B, 3 mg/kg (n=7)
Group B10: Compound B, 10 mg/kg (n=7)

The names of the compound A and the compound B are as follows.

Compound A: 17α-acetoxy-6-chloro-15β-hydroxy-2-oxa-4,6-pregnadiene-3,20-dione
Compound B: TZP-4238 (17α-acetoxy-6-chloro-2-oxa-4,6-pregnadiene-3,20-dione The residual urine volume, the urination efficiency, and the bladder capacity were measured as follows.

[Residual Urine Volume]

After urination, the residual urine was aspirated from the outlet end of the catheter placed in the bladder to measure the volume (mL) of the residual urine.

[Urination Efficiency]

After urination, the weight of the voided urine was measured to determine the voided volume (g=mL), and then the urination efficiency was calculated by the following equation:

$$\text{Urination efficiency (\%)} = [(\text{Voided volume (mL)})/(\text{Voided volume (mL)} + \text{Residual urine volume (mL)})] \times 100$$

[Bladder Capacity]

The bladder capacity was calculated from the voided volume and the residual urine volume by the following equation:

Bladder capacity(mL)=Voided volume (mL)+Residual urine volume (mL)

Moreover, the wet weight of the extracted bladder and that of the extracted kidney were measured.

FIG. 1 to FIG. 6 show the results of the residual urine volume, the urination efficiency, the bladder capacity, the wet weights of the extracted tissues (bladder, kidney), and the survival rate in the female rat lower urinary tract obstruction model. FIG. 1 shows a relationship between the residual urine volume and the test substances. FIG. 2 shows a relationship between the urination efficiency and the test substances. FIG. 3 shows a relationship between the bladder capacity and the test substances. FIG. 4 and FIG. 5 show a relationship between the bladder wet weight and the test substances and a relationship between the kidney wet weight and the test substances, respectively. FIG. 6 shows a relationship between the survival rate and the test substances.

As apparent from FIG. 1 to FIG. 3, Groups B (Group B3 and Group B10) showed significantly increased residual urine volume and bladder capacity and a reduced urination efficiency in comparison with the control group (the solvent group). In contrast, Group A showed significantly decreased residual urine volume and bladder capacity and an increased urination efficiency in comparison with the control group. Moreover, as apparent from FIG. 4 and FIG. 5, Group A was in the direction of significantly inhibiting the increase in the wet weights of the bladder and the kidney associated with lower urinary tract obstruction, in contrast, Groups B were rather in the direction of increasing these wet weights. Thus, Groups B were in the direction of not improving or the direction of rather deteriorating the urination function, in contrast, Group A showed a significant improvement of the urination function lowered due to lower urinary tract obstruction. Further, Group A showed a significant improved urination function in the female rat, having no the prostate, of the lower urinary tract obstruction model system. These results show that the compound A improves the urination disorder regardless of the presence of prostate enlargement.

Furthermore, as apparent from FIG. 6, Groups B showed a decreased survival rate of the lower urinary tract obstruction rats, in contrast, Group A showed no decrease in the survival rate. The results have confirmed that the compound A has a high safety.

It is not clear why the above-mentioned results were obtained in the female rats in spite of the fact that these test substances belong to the same 2-oxapregnane compound (progesterones). A possible reason may be as follows.

In clinical practice, it is considered that progesterone, which increases during pregnancy, relaxes the organs around the uterus including the bladder. It is reported that, with respect to rats, pregnancy and progesterone affect bladder muscarinic receptors to increase the bladder capacity or inhibit the bladder contraction (Pharmacology. 50 (3): 192-200. 1995). In addition to relaxation by progesterone, the bladder is functionally hypotonic due to mechanical compression from the rear by the pregnant uterus. Thus, progesterone may possibly induce the development or phenomenon of the residual urine or vesicoureteral reflux.

Groups B show a strong progesterone-like action and are considered or expected to inhibit the bladder contraction by the above-mentioned mechanism. In a pathological model in which the bladder function is strongly impaired, such as the female lower urinary tract obstruction model, it is possible that, for Groups B, excessive inhibition of the bladder contraction by the compound B resulted in exacerbation or deterioration of the pathology.

On the other hand, the compound A has a slight antiprogesterone action. Female rats have an estrus cycle of about four (4) days. It is possible that for Group A, the compound A antagonized endogenetic progesterone increasing according to the estrus cycle to protectively act on further inhibition of the bladder function in the lower urinary tract obstruction model.

Test Example 2

A lower urinary tract obstruction model of rats was used as a test system. A test substance was orally administered to the lower urinary tract obstruction model repeatedly over 14 days to examine the action on the urination function in the lower urinary tract obstruction model. The lower urinary tract obstruction model is not a benign prostatic hyperplasia model with enlarged prostate.

More specifically, the rats (male, Crl:CD(SD), 8-week-old; Charles River Laboratories Japan, Inc.) were operated to form lower urinary tract obstruction and repeatedly received oral administration of the test substance at a frequency of once a day over 14 days. After the completion of the administration, each rat was subjected to bladder catheterization under anesthesia and cystometry under no anesthesia and was evaluated for the residual urine volume and the urination efficiency.

The test substances and the dosage in the test system (male rats with lower urinary tract obstruction) are as follows.

Solvent group (control group): 0.5 v/v % Polysorbate 80 solution, 10 mL/kg (n=8)
Group A: Compound A, 10 mg/kg (n=12)
Group C: Compound C (dutasteride), 0.5 mg/kg (n=11)
Dutasteride is a 5α reductase inhibitor.

The results are shown in FIG. 7 and FIG. 8.

FIG. 7 and FIG. 8 indicate that, in the male rat lower urinary tract obstruction model, Group A has a strong improvement action on the urination function (the residual urine volume, the urination efficiency) in comparison with Group C (dutasteride).

Test Example 3

High-week-old male rats (22-week-old; Charles River Laboratories Japan, Inc.) were examined and evaluated for the relationship between the test substances and the bladder and urethra contraction reaction. Since the rats are high-week-old, the rats are a model in which the prostate is predicted to be enlarged.

A test substance was orally administered to the high-week-old male rats repeatedly at a frequency of once a day over two (2) weeks, and then, from each rat, a bladder specimen was extracted. The bladder specimen was suspended at a resting tension of about 9.8 mN in a constant-temperature Magnus tube (37° C.) filled with a physiological salt solution aerated with 95% $O_2$-5% $CO_2$ gas and was subjected to an isometric contraction test by applying a square-wave electrical field stimulation (EFS, Amplitude; 0.3 ms, Frequency; 1, 2, 5, 10, 20 Hz, Duration; 5 s); or Carbachol (CCH, 100 nmol/L to 100 μmol/L) and KCl (40, 80 mmol/L).

The test substances and the dosage in the test system (high-week-old male rats) are as follows.

Solvent group (control group): 0.5 v/v % Polysorbate 80 solution, 10 mL/kg (n=6)

Group A: Compound A, 10 mg/kg (n=6)

Group C: Compound C (dutasteride), 0.3 mg/kg (n=6)

The results are shown in FIG. 9 and FIG. 10.

FIG. 9 and FIG. 10 have revealed that the bladder contraction tension caused by square-wave electrical field stimulation (bladder efferent nerve stimulation) or Carbachol (muscarinic receptor stimulation) and KCl (depolarization-dependent $Ca^{2+}$ stimulation) is significantly strong or has a strong directionality in Group A compared with Group C.

Test Example 4

As described below, as a urination disorder model, a urination disorder model associated with diabetes was prepared to evaluate the urination disorder. This model has no benign prostatic hyperplasia and is a model of a urination disorder associated with neuropathy and smooth muscle contraction disorder.

The body weights of rats (male, Crl:CD(SD), 5-week-old; Charles River Laboratories Japan, Inc.) were measured. After the rats were fasted overnight, the blood was collected from the caudal vein to measure the fasting blood glucose. On the basis of the body weight and the tasting blood glucose level, the rats were grouped or divided into two (2) groups by randomized, multivariable block allocation. The day after the rats were grouped, a first group received intraperitoneal administration of a citrate buffer (pH 4.5) (10 mL/kg) having a concentration of 0.1 mmol/L, and a second group received intraperitoneal administration of streptozocin (STZ; Sigma-Aldrich) (50 mg/kg). Streptozocin (STZ) was administered in the form of a solution of streptozocin having a concentration of 5 mg/mL in the citrate buffer.

About one (1) week after streptozocin (STZ) was administered, the body weight and the fasting blood glucose were measured. In the streptozocin (STZ) administration group (the second group), individuals having a fasting blood glucose level of not less than 300 mg/dL were used as animals with induced diabetes. These animals with induced diabetes are a model having no abnormality of the prostate (having no benign prostatic hyperplasia). On the basis of the body weight and the fasting blood glucose level, the animals (models) with induced diabetes were grouped or divided into three (3) groups by randomized, multivariable block allocation.

To the three model groups with induced diabetes, a 0.5 v/v % Polysorbate 80 solution (0.5% P) (10 mL/kg), the compound A (3 mg/kg), and the compound A (10 mg/kg) were orally administered, respectively, wherein the administration schedule in all groups was a frequency of once a day, only on weekdays, over four (4) weeks. Moreover, to the above-mentioned first group, a 0.5 v/v % Polysorbate 80 solution (0.5% P) (10 mL/kg) was orally administered in the same administration schedule (normal group). On the last day of administration, a cannula was inserted into and secured to the dome of the bladder under isoflurane anesthesia, and cystometry (Cystometogram, CMG) was conducted in the order of under awake condition and under urethane anesthesia to measure the intravesical pressure, the voided volume, and the residual urine volume. After the completion of the measurement, the blood was collected under deep isoflurane anesthesia, and then the prostate (ventral prostate, dorsolateral prostate), the seminal vesicle, the bladder, and the kidney were extracted and were each weighed. Moreover, the blood glucose level in the collected blood was measured.

The test substances and the dosage in the test system (rats having the urination disorder associated with diabetes) are as follows.

Normal group: citrate buffer 10 mL/kg (intraperitoneal administration), 0.5% P 10 mL/kg (oral administration) (n=10)

Solvent group (control group): STZ 50 mg/kg (intraperitoneal administration), 0.5% P 10 mL/kg (oral administration) (n=10)

Group A3: STZ 50 mg/kg (intraperitoneal administration), Compound A 3 mg/kg (oral administration) (n=10)

Group A10: STZ 50 mg/kg (intraperitoneal administration), Compound A 10 mg/kg (oral administration) (n=9)

Urination Parameter:

The resulting data of the intravesical pressure, the voided volume, and the residual urine volume were analyzed, and the bladder capacity (mL), the residual urine volume (mL), and the urination efficiency (%) were determined as urination parameters in each urination. With respect to these urination parameters, the average value of two measurements was calculated and was taken as a measured value of each individual.

Tissue Weight:

From the weights of the ventral prostate and the dorsolateral prostate, the weight of the whole prostate was calculated. Each weight of the prostate, the seminal vesicle, the bladder, and the kidney was converted to a tissue weight per 100 g of the body weight. For Group A3 and Group A10, which received the compound A, the inhibition rate of each weight of the prostate and the seminal vesicle relative to each weight of the prostate and the seminal vesicle in the solvent group was calculated (with one decimal place).

In statistical analysis, the average value and the standard deviation were calculated for each group with respect to the final body weight, the tissue weights (the prostate, the seminal vesicle, the bladder, and the kidney) per 100 g of the body weight, the blood glucose level, and various urination parameters. For the statistical analysis, significant difference tests were performed with SAS statistical analysis system (SAS version 9.4; manufactured by SAS Institute Japan Ltd.). Two-sided Student's t test was performed between the normal group and the solvent group, and it was judged that a significance level (critical rate) below 5% has a statistically significant difference. Moreover, Williams's multiple comparison test was performed between the solvent group and Group A3 and between the solvent group and Group A10, and it was judged that a significance level (critical rate) below 2.5% has a statistically significant difference.

Asterisk "*" indicates a significance of 5% (P<0.05 (versus the normal group) (Student's t test)), and pound "#" indicates a significance of 2.5% (P<0.025 (versus the solvent group) (Williams's multiple comparison test)).

Bladder Contraction Force by Nomogram Analysis:

In cystometry (CMG) under anesthesia, the maximum urinary flow rate (mL/second) and the intravesical pressure ($cmH_2O$) at maximum flow were determined to evaluate the bladder contraction force on urination for each group. Specifically, for each group, the average value of the maximum urinary flow rate Qmax (mL/second), that of the intravesical pressure at maximum flow PdetQmax ($cmH_2O$), and that of the bladder capacity BC (mL) were calculated, and the maximum urinary flow rate/bladder capacity on the Y-axis was plotted relative to the intravesical pressure at maximum flow/bladder capacity on the X-axis. It was judged that the shorter the distance from the origin is, the weaker the bladder contraction force is, and the farther the distance from the origin is, the stronger the bladder contraction force is.

The results are shown in Table 1, FIG. 11 to FIG. 13 (cystometry (CMG) data under awake condition), FIG. 14 to FIG. 16 (cystometry (CMG) data under anesthesia), and FIG. 17 (nomogram analysis results). In each column in Table, "average value ±standard deviation" is listed.

TABLE 1

|  |  | Normal group | Model with induced diabetes | | |
|---|---|---|---|---|---|
|  |  |  | Solvent group | Group A3 | Group A10 |
| Body weight (g) |  | 405.3 ± 47.1 | 322.2 ± 43.8* | 327.5 ± 51.3 | 356.4 ± 60.9 |
| Prostate (mg/100 g body weight) | Ventral prostate (atrophy rate) | 129.7 ± 28.9 | 109.1 ± 9.7* | 62.2 ± 11.4# (43.0%) | 53.1 ± 13.5# (51.3%) |
|  | Dorsolateral prostate (atrophy rate) | 70.2 ± 14.9 | 63.2 ± 13.0 | 35.3 ± 7.8# (44.2%) | 28.8 ± 6.1# (54.5%) |
|  | Whole (atrophy rate) | 199.8 ± 41.2 | 172.3 ± 14.3 | 97.5 ± 17.7# (43.4%) | 81.9 ± 19.0# (52.5%) |
| Seminal vesicle (mg/100 g body weight) (atrophy rate) |  | 85.3 ± 15.7 | 76.1 ± 11.2 | 44.3 ± 9.6# (41.8%) | 37.9 ± 6.4# (50.2%) |
| Bladder (mg/100 g body weight) |  | 28.1 ± 4.1 | 80.2 ± 12.1* | 79.3 ± 17.5 | 72.9 ± 11.6 |
| Kidney (mg/100 g body weight) |  | 662.8 ± 68.5 | 1180.3 ± 156.5* | 1114.9 ± 189.2 | 1171.0 ± 213.3 |
| Blood glucose level (mg/dL) |  | 2474 ± 89.1 | 898 ± 371.2* | 912.8 ± 177.3 | 846.7 ± 342.5 |

[Body Weight, Tissue Weight, and Blood Glucose Level]

The solvent group (the control group) showed a significantly decreased body weight and significantly increased bladder and kidney weights in comparison with the normal group. Moreover, the blood glucose level was also significantly increased. In contrast, Group A3 and Group A10 showed significantly decreased prostate and seminal vesicle weights and showed no action or influence on the body weight, the blood glucose level, and the bladder and kidney weights.

As apparent from the blood glucose level of Group A3 and Group A10 relative to the solvent group, no therapeutic effect on diabetes is found in the compound A. Moreover, the model with induced diabetes develops a urination disorder having no enlarged prostate.

[Cystometry (CMG): Bladder Capacity, Residual Urine Volume, and Urination Efficiency]

FIG. 11 to FIG. 13 show the analysis results of the cystometry (CMG) measurement data under awake condition. The solvent group (the control group) showed significantly increased bladder capacity and residual urine volume and a significantly reduced urination efficiency in comparison with the normal group. In comparison with the solvent group (the control group), Group A3 showed significantly reduced bladder capacity and residual urine volume and an improved urination efficiency. Group A10 also showed significantly reduced bladder capacity and residual urine volume and a significantly improved urination efficiency (P=0.0359, Williams's multiple comparison test).

FIG. 14 to FIG. 16 show the analysis results of the cystometry (CMG) measurement data under anesthesia. The solvent group (the control group) showed significantly increased bladder capacity and residual urine volume and a significantly reduced urination efficiency in comparison with the normal group. In comparison with the solvent group (the control group), Group A3 showed a significantly decreased residual urine volume. Group A10 also showed a significantly decreased residual urine volume and a reduced bladder capacity (P=0.0336, Williams's multiple comparison test). Moreover, Group A3 and Group A10 showed an improved urination efficiency.

Further, in the nomogram analysis (FIG. 17), it is judged that Group A3 and Group A10, each of which had a farther distance from the origin, have a strong bladder contraction force on urination in comparison with the solvent group (the control group).

Thus, the compound A shows no therapeutic effect on diabetes (Group A3 and Group A10) and further significantly improves the urination disorder in the model with induced diabetes having no enlarged prostate.

Test Example 5

For the compound A and the compound D (mifepristone), the antiprogesterone activity was measured. Specifically, a sex hormone and a test substance were repeatedly administered to ovariectomized rats as a test system to examine the antiprogesterone action (antiprogesterone activity) based on, as an index, the fluctuation of the uterine weight (the inhibitory action relative to the increase of the weight) associated with rat deciduoma formation.

More specifically, rats (female, Crl:CD(SD), 5-week-old: Charles River Laboratories Japan, Inc.) were subjected to ovariectomy, and from one (1) week after the ovariectomy, a high dose estrone or 5 µg/one animal was hypodermically administered to the rats once a day for three (3) days. From the day after one day rest period, the rats received, once a day over eight (8) days, hypodermic administration of a low dose estrone (1 µg/one animal), intramuscular administration of progesterone (6 mg/kg), and oral administration of a test substance. In the middle of the administration, on Day 4 of the start of administration, the rats were subjected to a stimulation treatment of decidualization reaction to the right uterus. The day after the final administration, the uterine weight (right uterine body) was measured (n=6). Group E was subjected to ovariectomy and a stimulation treatment of decidualization reaction but was not subjected to a hormone treatment.

The test substances and the dosage in the test system (ovariectomized rats) are as follows.

Group E: rats with ovariectomy without hormone treatment
0.5 v/v % Polysorbate 80 solution, 10 mL/kg (n=6)
Solvent group (control group): 0.5 v/v % Polysorbate 80 solution, 10 mL/kg (n=6)
Group A3: Compound A, 3 mg/kg (n=6)
Group A10: Compound A, 10 mg/kg (n=6)
Group A30: Compound A, 30 mg/kg (n=6)
Group D: Compound D (mifepristone), 3 mg/kg (n=6)
The results are shown in FIG. 18.

As shown in FIG. 18, compared with the solvent group, Group D showed a significant inhibitory action (inhibition rate: 89.51). Compared with the solvent group, although Group A3 did not show a significant inhibitory action (inhibition rate: 15.0%), Group A10 and Group A30 showed a significant inhibitory action (inhibition rate: 63.0a and 83.3%, respectively). The results have revealed that the compound A has an antiprogesterone activity.

Test Example 6

As described below, a model of a urination disorder associated with streptozocin-induced diabetes was prepared as a urination disorder model in accordance with Test Example 4 to evaluate the effects of the compound A and the compound C on a urination disorder. This model has no benign prostatic hyperplasia and is a model of a urination disorder associated with neuropathy and smooth muscle contraction disorder.

The body weights of Rats (male, Crl:CD(SD), 5-week-old; Charles River Laboratories Japan, Inc.) were measured. On the basis of the body weight, the rats were grouped or divided into two (2) groups. The day after the rats were grouped, a fist group received intraperitoneal administration of a citrate buffer (pH 4.5) (10 mL/kg) having a concentration of 0.1 mmol/L, and a second group received intraperitoneal administration of streptozocin (STZ; Sigma-Aldrich) (50 mg/kg). Streptozocin (STZ) was administered in the form of a solution of streptozocin having a concentration of 5 mg/mL in the citrate buffer.

About one (1) week after streptozocin (STZ) was administered, the body weight and the fasting blood glucose were measured. In the streptozocin (STZ) administration group (the second group), individuals having a fasting blood glucose level of not less than 300 mg/dL were used as animals with induced diabetes. These animals with induced diabetes are a model having no abnormality of the prostate (having no benign prostatic hyperplasia). On the basis of the body weight and the fasting blood glucose level, the animals (models) with induced diabetes were grouped or divided into three (3) groups by randomized, multivariable block allocation.

To the three model groups with induced diabetes, a 0.5 v/v % Polysorbate 80 solution (0.5% P) (10 mL/kg), the compound A (3 mg/kg), and the compound C (dutasteride) (0.3 mg/kg) were orally administered, respectively, wherein the administration schedule in all groups was a frequency of once a day, only on weekdays, over four (4) weeks. Moreover, to the above-mentioned first group, a 0.5 v/v % Polysorbate 80 solution (0.5% P) (10 mL/kg) was orally administered in the same administration schedule (normal group). On the last day of administration, a cannula was inserted into and secured to the dome of the bladder under isoflurane anesthesia, and cystometry (Cystometogram, CMG) was conducted in the order of under awake condition and under urethane anesthesia to measure the intravesical pressure, the voided volume, and the residual urine volume. After the completion of the measurement, the blood was collected under deep isoflurane anesthesia, and then the prostate (ventral prostate, dorsolateral prostate) was extracted and each was weighed. Moreover, the blood glucose level in the collected blood was measured.

The test substances and the dosage in the test system (rats having the urination disorder associated with diabetes) are as follows.

Normal group: citrate buffer 10 mL/kg (intraperitoneal administration), 0.5% P 10 mL/kg (oral administration) (n=10)

Solvent group (control group): STZ 50 mg/kg (intraperitoneal administration), 0.5% P 10 mL/kg (oral administration) (n=10)

Group A3: STZ 50 mg/kg (intraperitoneal administration), Compound A 3 mg/kg (oral administration) (n=10)

Group C0.3: STZ 50 mg/kg (intraperitoneal administration), Compound C (dutasteride) 0.3 mg/kg (oral administration) (n=10)

Urination parameter: In the same manner as in Test Example 4, the residual urine volume (mL) and the urination efficiency % were determined as urination parameters in each urination, and the average value of two measurements was taken as a measured value of each individual.

Prostate weight: In the same manner as in Test Example 4, the weight of the prostate (ventral prostate, dorsolateral prostate, and whole) was converted to a tissue weight per 100 g of the body weight. For Group A3, which received the compound A, and Group C0.3, which received the compound C, the inhibition rate of the weight of the prostate relative to the weight of the prostate in the solvent group was calculated (with one decimal place).

In statistical analysis, significant difference tests were performed in the same manner as Test Example 4. Two-sided Student's t test was performed between the normal group and the solvent group to judge that a significance level (critical rate) below 5% has a statistically significant difference, wherein asterisk "*" indicates a significance of 5%. Moreover, Dunnett's multiple comparison test was performed between the solvent group and Group A3 and between the solvent group and Group C0.3 to judge that a significance level (critical rate) below 5% has a statistically significant difference, wherein pound "#" indicates a significance of 5%.

Bladder contraction force by nomogram analysis: In the same manner as in Test Example 4, each group was evaluated for the bladder contraction force on urination. The maximum urinary flow rate/bladder capacity on the Y-axis was plotted relative to the intravesical pressure at maximum flow/bladder capacity on the X-axis. It was judged that the shorter distances from the origin is, the weaker the bladder contraction force is, and the farther distance from the origin is, the stronger the bladder contraction force is.

The results are shown in Table 2, FIG. 19 and (cystometry (CMG) data under awake condition) and FIG. 21 (nomogram analysis results).

TABLE 2

| | | Normal group | Model with induced diabetes | | |
|---|---|---|---|---|---|
| | | | Solvent group | Group A3 | Group C0.3 |
| Prostate (mg/100 g body weight) | Ventral prostate (atrophy rate) | 112.4 ± 32.9 | 101.9 ± 30.3 | 61.2 ± 12.4[#] (40.0%) | 58.4 ± 8.4[#] (42.7%) |
| | Dorsolateral prostate (atrophy rate) | 64.3 ± 12.4 | 64.8 ± 16.6 | 38.8 ± 4.2[#] (40.2%) | 40.5 ± 6.3[#] (37.5%) |
| | Whole (atrophy rate) | 176.7 ± 40.2 | 166.7 ± 45.8 | 99.9 ± 15.5[#] (40.1%) | 98.9 ± 12.2[#] (40.7%) |
| Blood glucose level (mg/dL) | | 261.6 ± 43.3 | 925.3 ± 225.2* | 972.4 ± 312.3 | 984.2 ± 282.0 |

[Prostate Weight and Blood Glucose Level]

Compared with the solvent group, Group A3 and Group C0.3 showed significant decrease in the weights of the ventral prostate, the dorsolateral prostate, and the whole prostate with the same level (P<0.05). The comparison of the normal group with the solvent group shows no significant difference in the prostate weight, and thus it is conformed that the model with induced diabetes is a model having no enlarged prostate. For such a diabetes model, since Group A3 and Group C0.3 did not statistically affect the blood glucose level of the solvent group as the same as in Test Example 4 described above, it has confirmed that the compound A and the compound C show no therapeutic effect on diabetes.

Cystometry (CMG): Residual urine volume and urination efficiency]

From the analysis results of the cystometry (CMG) measurement data under awake condition, as shown in FIG. 19 and FIG. 20, the solvent group showed a significantly increased residual urine volume and a significantly reduced urination efficiency associated with STZ treatment (induction of diabetes) in comparison with the normal group (p<0.05). From these results, the model with induced diabetes develops a urination disorder. Meanwhile, Group A3 showed a significantly decreased residual urine volume in comparison with the solvent group (p<0.05), although Group C0.3 did not statistically affect the residual urine volume in comparison with the solvent group. Moreover, Group A3 showed a significantly improved urination efficiency in comparison with the solvent group (p<0.05), while Group C0.3 did not statistically affect the urination efficiency in comparison with the solvent group. In the urination efficiency, it was confirmed that there was a tendency to show a statistical difference between Group A3 and Group C0.3 (p=0.0757, Student's t test).

In the nomogram analysis (FIG. 21), the normal group showed the farthest distance from the origin, and Group C0.3 was at almost the same position as the solvent group. In contrast, Group A3 showed a farther distance from the origin in comparison with the solvent group. From these results, it is judged that Group A3 has a strong bladder contraction force on urination in comparison with the solvent group and Group C0.3.

Thus, the compound A (Group A3) shows no therapeutic effect on diabetes and further significantly improves the urination disorder even in the model with induced diabetes having no enlarged prostate.

INDUSTRIAL APPLICABILITY

According to the present invention, since the urination disorder-improving agent contains the 2-oxapregnane compound represented by the formula (1), and the agent effectively improves the urination disorder such as feeling of incomplete emptying, slow stream, urinary incontinence, or frequent urination. Thus, quality of life of human beings (in particular, older persons) suffering from the urination disorder can be improved and enhanced.

The invention claimed is:

1. A method of improving a urination disorder, the method comprising administering a therapeutically effective amount of a urination disorder-improving agent comprising 17α-acetoxy-6-chloro-15ß-hydroxy-2-oxa-4,6-pregnadiene-3,20-dione as an active ingredient to a subject.

2. The method according to claim 1, wherein the urination disorder is a urination disorder associated with benign prostatic hyperplasia.

3. The method according to claim 1, wherein the urination disorder is a urination disorder having no benign prostatic hyperplasia.

4. The method according to claim 1, wherein the urination disorder is a urination disorder associated with a smooth muscle contraction disorder.

5. The method according to claim 1, wherein the urination disorder is urination disorder associated with at least one disease selected from the group consisting of a disease causing neurogenic bladder, diabetes, and neuropathy associated with diabetes.

6. The method according to claim 1, wherein the urination disorder-improving agent improves or promotes urination.

7. The method according to claim 1, wherein a dosage of the agent is 0.01 to 100 mg per day in terms of the 17α-acetoxy-6 chloro-15β-hydroxy-2-oxa-4,6-pregnadiene-3,20-dione.

* * * * *